US012737146B2

(12) United States Patent
Sumita

(10) Patent No.: US 12,737,146 B2
(45) Date of Patent: Sep. 15, 2026

(54) PRINTING APPARATUS, CONTROL METHOD, AND STORAGE MEDIUM

(71) Applicant: CANON KABUSHIKI KAISHA, Tokyo (JP)

(72) Inventor: Chisei Sumita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 18/437,040

(22) Filed: Feb. 8, 2024

(65) Prior Publication Data

US 2024/0272845 A1 Aug. 15, 2024

(30) Foreign Application Priority Data

Feb. 13, 2023 (JP) ................................ 2023-019679

(51) Int. Cl.
*G06F 3/12* (2006.01)

(52) U.S. Cl.
CPC .......... *G06F 3/1232* (2013.01); *G06F 3/1203* (2013.01)

(58) Field of Classification Search
CPC ........ G06F 3/1232; G06F 3/1203; G06F 3/12; G06F 3/1287
See application file for complete search history.

(56) References Cited

U.S. PATENT DOCUMENTS 12,346,615 B2 * 7/2025 Fujisawa .............. G06F 3/1217
12,367,001 B2 * 7/2025 Sako ..................... G06F 3/1253
2012/0300249 A1 * 11/2012 Shustef ................. G06F 3/1265 358/1.15
2013/0135668 A1 * 5/2013 Minagawa ........... G06F 3/1205 358/1.15
2017/0269881 A1 * 9/2017 Naitoh ............... G06K 15/1823
2020/0005102 A1 * 1/2020 Nakamoto ........... G06K 15/007
2020/0409624 A1 * 12/2020 Saigusa ................. G06F 21/608
2021/0326087 A1 * 10/2021 Inoue .................... G06F 3/1292
2021/0349667 A1 * 11/2021 Soma .................... G06F 3/1229
2021/0382671 A1 * 12/2021 Yamamichi ........... G06F 3/1292
2022/0066705 A1 * 3/2022 Kuroda ................. G06F 3/1292
2022/0179603 A1 * 6/2022 Sako ..................... G06F 3/1205
2022/0317951 A1 * 10/2022 Yasuda ................... H04L 51/10
2022/0326897 A1 * 10/2022 Yamamichi ........... G06F 3/1238

FOREIGN PATENT DOCUMENTS

JP 2012133489 A 7/2012

* cited by examiner

*Primary Examiner* — Ted W Barnes
(74) *Attorney, Agent, or Firm* — Canon U.S.A., Inc. IP Division

(57) ABSTRACT

A printing apparatus capable of, upon reception of a request for registering a printing apparatus, registering the printing apparatus, and, upon reception of an instruction for performing printing on the registered printing apparatus, performing communication via the Internet and a print service for providing the printing apparatus with a print job, the printing apparatus includes at least one first processor and at least one first memory coupled to the first processor and having stored thereon instructions, when executed by the first processor, cooperating to act as: a reception unit configured to receive storage information for storing icon image data of the printing apparatus from the print service, a storage unit configured to store the icon image data of the printing apparatus based on the storage information.

9 Claims, 20 Drawing Sheets

FIG.1

101 PRINTING APPARATUS

INTERNET

102 CLOUD PRINT SERVICE

103 ICON DATA STORAGE SERVER

INTERNET

104 CLIENT TERMINAL

FIG.6A

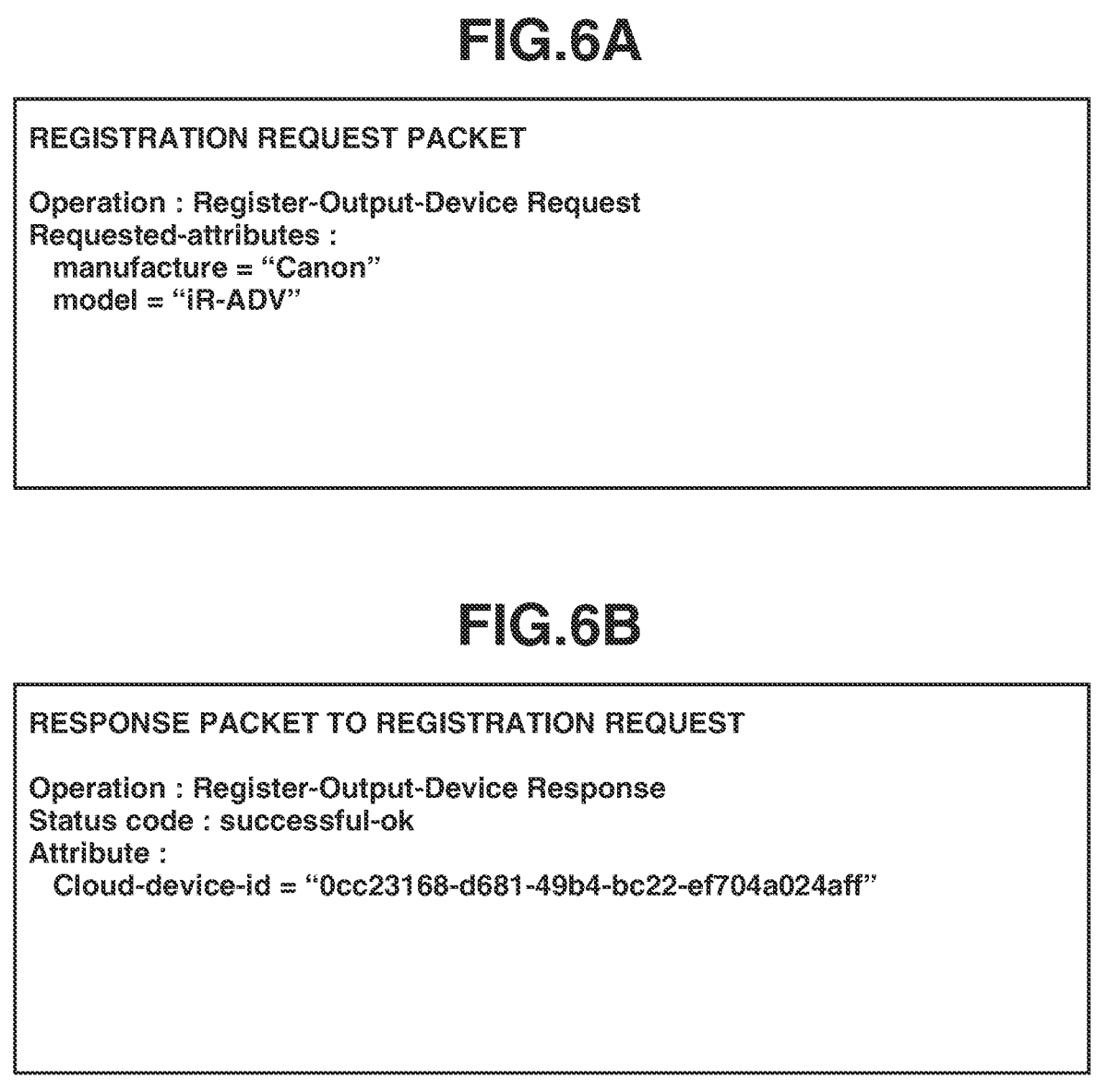

REGISTRATION REQUEST PACKET

Operation : Register-Output-Device Request
Requested-attributes :
manufacture = "Canon"
model = "iR-ADV"

FIG.6B

RESPONSE PACKET TO REGISTRATION REQUEST

Operation : Register-Output-Device Response
Status code : successful-ok
Attribute :
Cloud-device-id = "0cc23168-d681-49b4-bc22-ef704a024aff"

FIG.7A

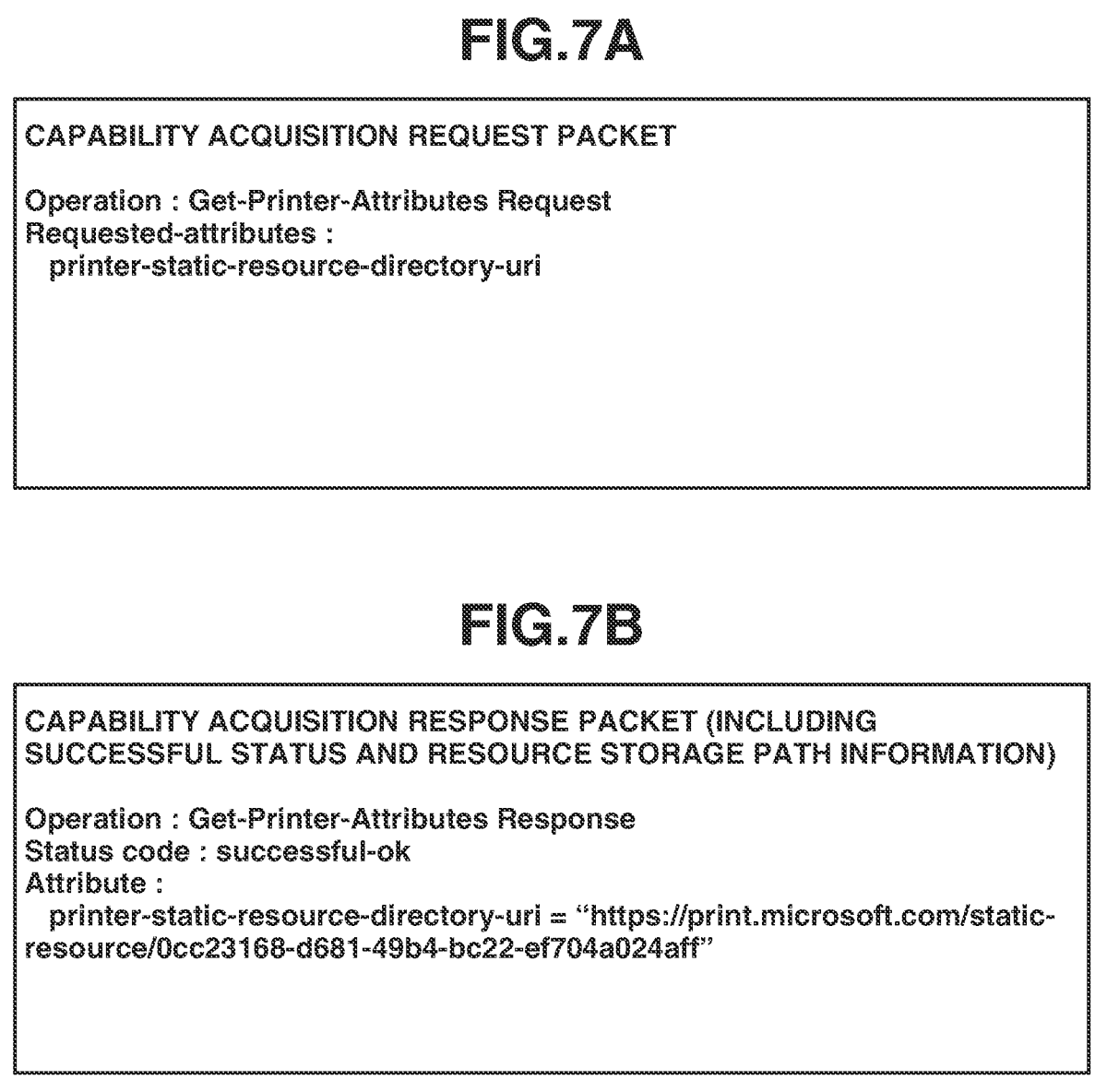

CAPABILITY ACQUISITION REQUEST PACKET

Operation : Get-Printer-Attributes Request
Requested-attributes :
printer-static-resource-directory-uri

FIG.7B

CAPABILITY ACQUISITION RESPONSE PACKET (INCLUDING SUCCESSFUL STATUS AND RESOURCE STORAGE PATH INFORMATION)

Operation : Get-Printer-Attributes Response
Status code : successful-ok
Attribute :
printer-static-resource-directory-uri = "https://print.microsoft.com/static-resource/0cc23168-d681-49b4-bc22-ef704a024aff"

FIG.7C

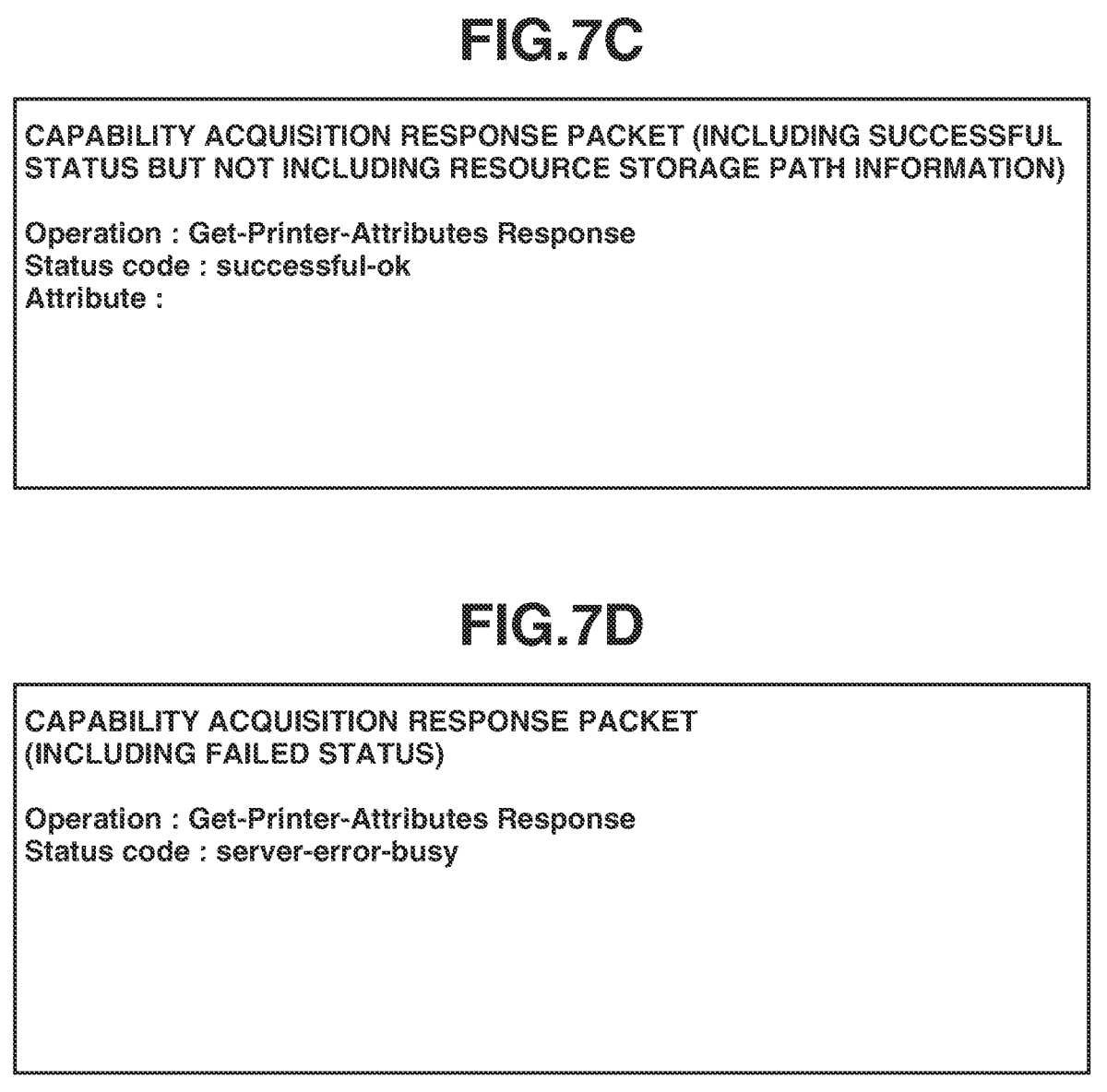

CAPABILITY ACQUISITION RESPONSE PACKET (INCLUDING SUCCESSFUL STATUS BUT NOT INCLUDING RESOURCE STORAGE PATH INFORMATION)

Operation : Get-Printer-Attributes Response
Status code : successful-ok
Attribute :

FIG.7D

CAPABILITY ACQUISITION RESPONSE PACKET (INCLUDING FAILED STATUS)

Operation : Get-Printer-Attributes Response
Status code : server-error-busy

FIG.8A

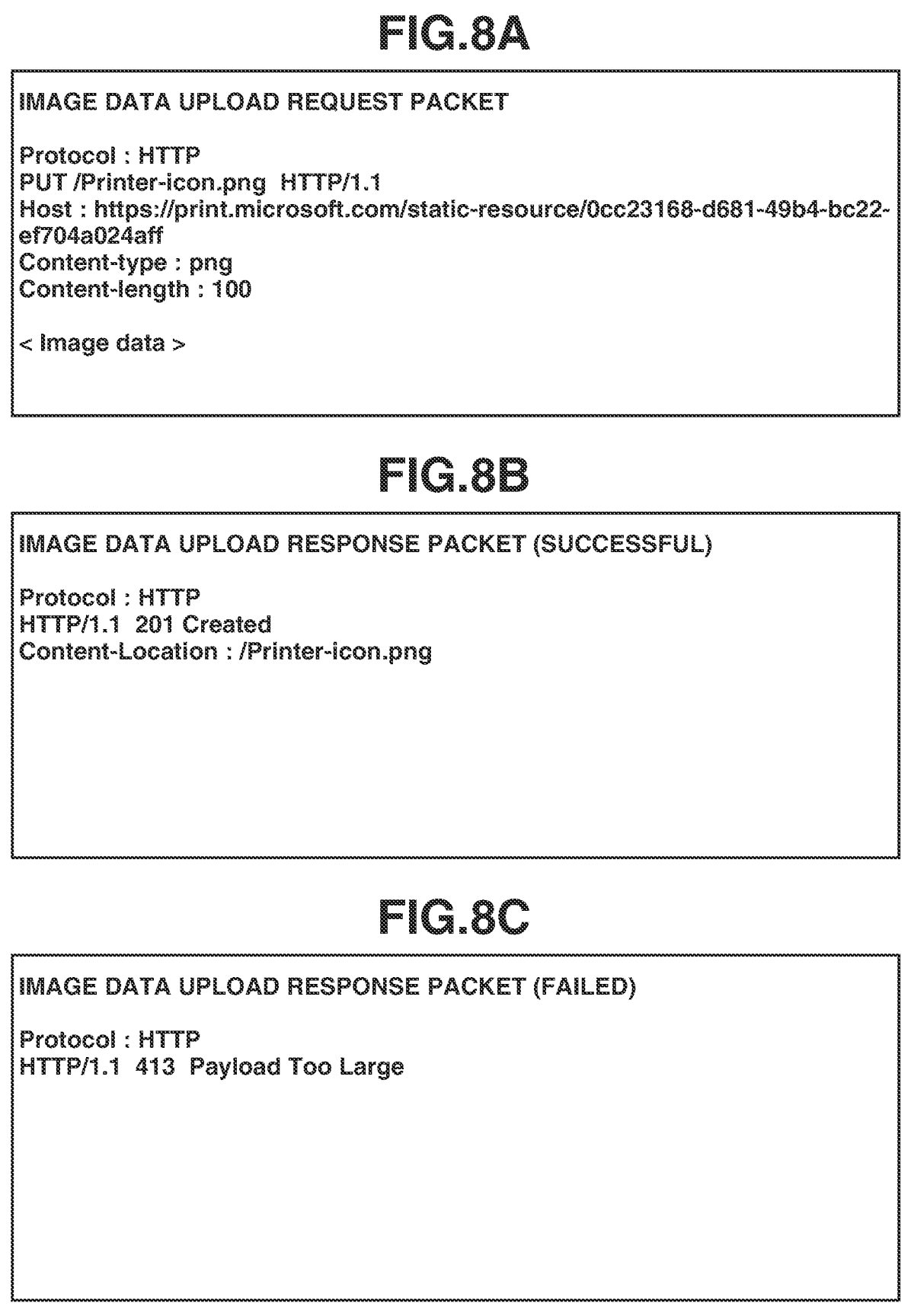

IMAGE DATA UPLOAD REQUEST PACKET

Protocol : HTTP
PUT /Printer-icon.png HTTP/1.1
Host : https://print.microsoft.com/static-resource/0cc23168-d681-49b4-bc22-ef704a024aff
Content-type : png
Content-length : 100

< Image data >

FIG.8B

IMAGE DATA UPLOAD RESPONSE PACKET (SUCCESSFUL)

Protocol : HTTP
HTTP/1.1 201 Created
Content-Location : /Printer-icon.png

FIG.8C

IMAGE DATA UPLOAD RESPONSE PACKET (FAILED)

Protocol : HTTP
HTTP/1.1 413 Payload Too Large

FIG.9A

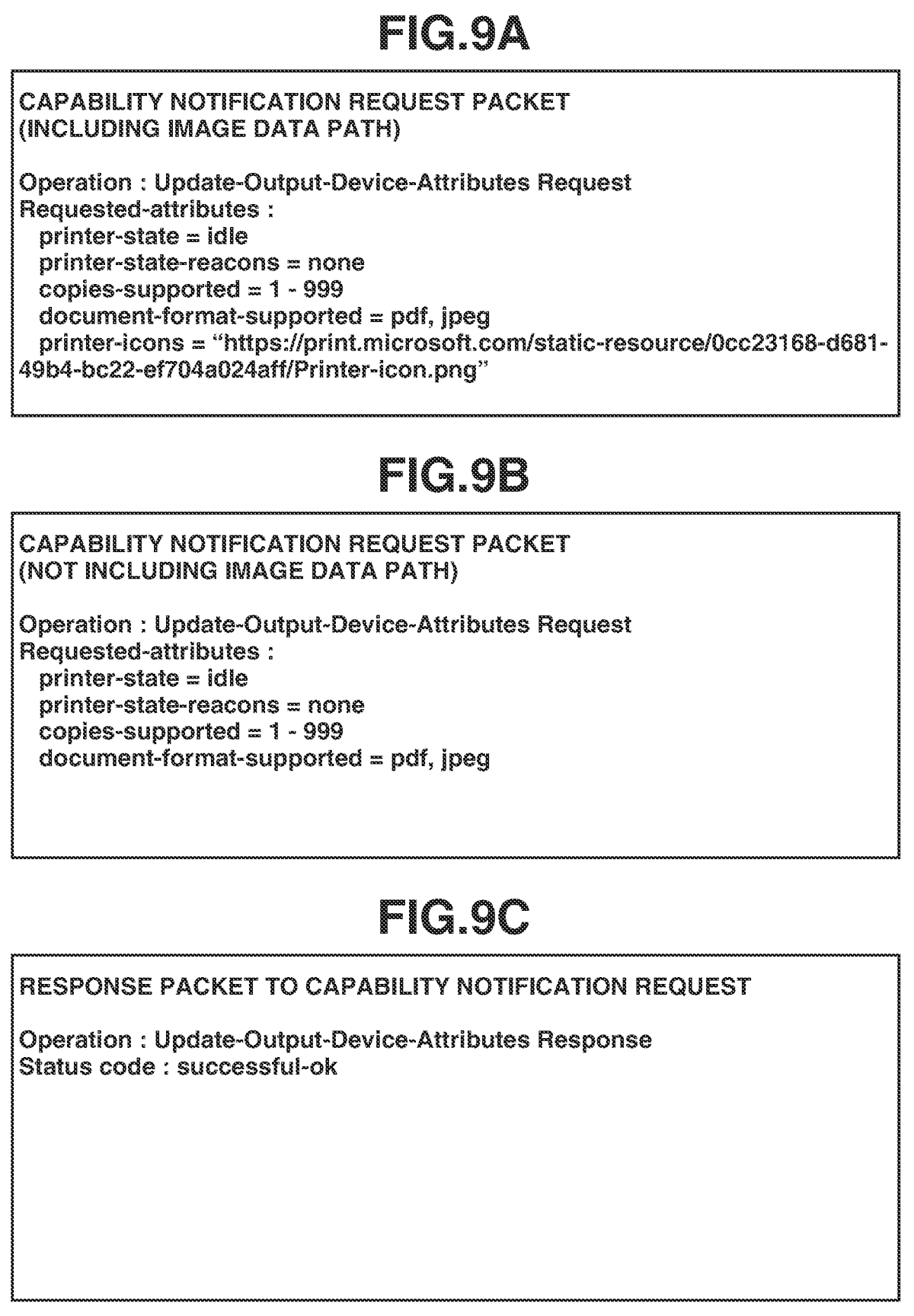

CAPABILITY NOTIFICATION REQUEST PACKET
(INCLUDING IMAGE DATA PATH)

Operation : Update-Output-Device-Attributes Request
Requested-attributes :
printer-state = idle
printer-state-reacons = none
copies-supported = 1 - 999
document-format-supported = pdf, jpeg
printer-icons = "https://print.microsoft.com/static-resource/0cc23168-d681-49b4-bc22-ef704a024aff/Printer-icon.png"

FIG.9B

CAPABILITY NOTIFICATION REQUEST PACKET
(NOT INCLUDING IMAGE DATA PATH)

Operation : Update-Output-Device-Attributes Request
Requested-attributes :
printer-state = idle
printer-state-reacons = none
copies-supported = 1 - 999
document-format-supported = pdf, jpeg

FIG.9C

RESPONSE PACKET TO CAPABILITY NOTIFICATION REQUEST

Operation : Update-Output-Device-Attributes Response
Status code : successful-ok

FIG.10A

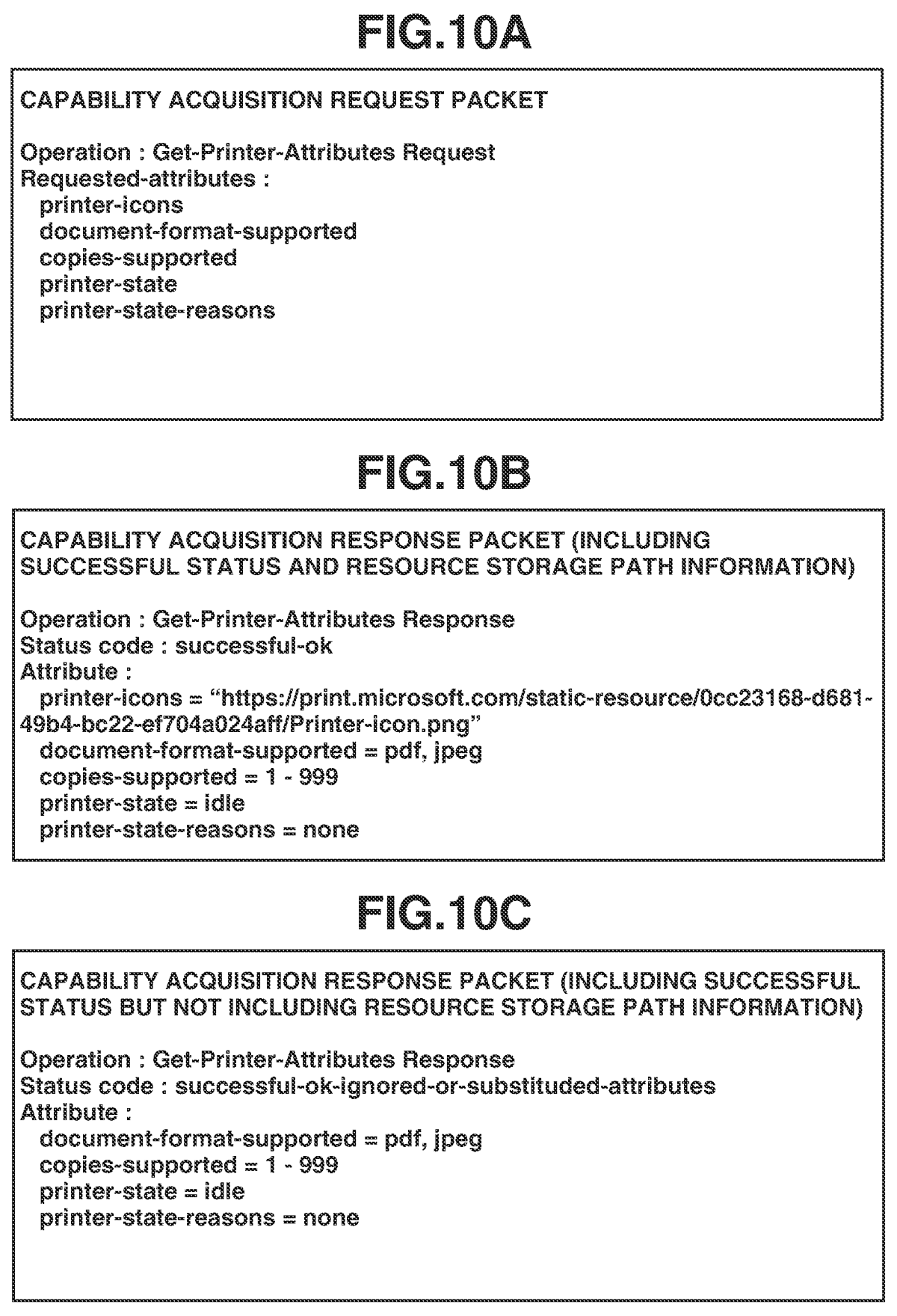

CAPABILITY ACQUISITION REQUEST PACKET

Operation : Get-Printer-Attributes Request
Requested-attributes :
printer-icons
document-format-supported
copies-supported
printer-state
printer-state-reasons

FIG.10B

CAPABILITY ACQUISITION RESPONSE PACKET (INCLUDING SUCCESSFUL STATUS AND RESOURCE STORAGE PATH INFORMATION)

Operation : Get-Printer-Attributes Response
Status code : successful-ok
Attribute :
printer-icons = "https://print.microsoft.com/static-resource/0cc23168-d681-49b4-bc22-ef704a024aff/Printer-icon.png"
document-format-supported = pdf, jpeg
copies-supported = 1 - 999
printer-state = idle
printer-state-reasons = none

FIG.10C

CAPABILITY ACQUISITION RESPONSE PACKET (INCLUDING SUCCESSFUL STATUS BUT NOT INCLUDING RESOURCE STORAGE PATH INFORMATION)

Operation : Get-Printer-Attributes Response
Status code : successful-ok-ignored-or-substituded-attributes
Attribute :
document-format-supported = pdf, jpeg
copies-supported = 1 - 999
printer-state = idle
printer-state-reasons = none

FIG.11A

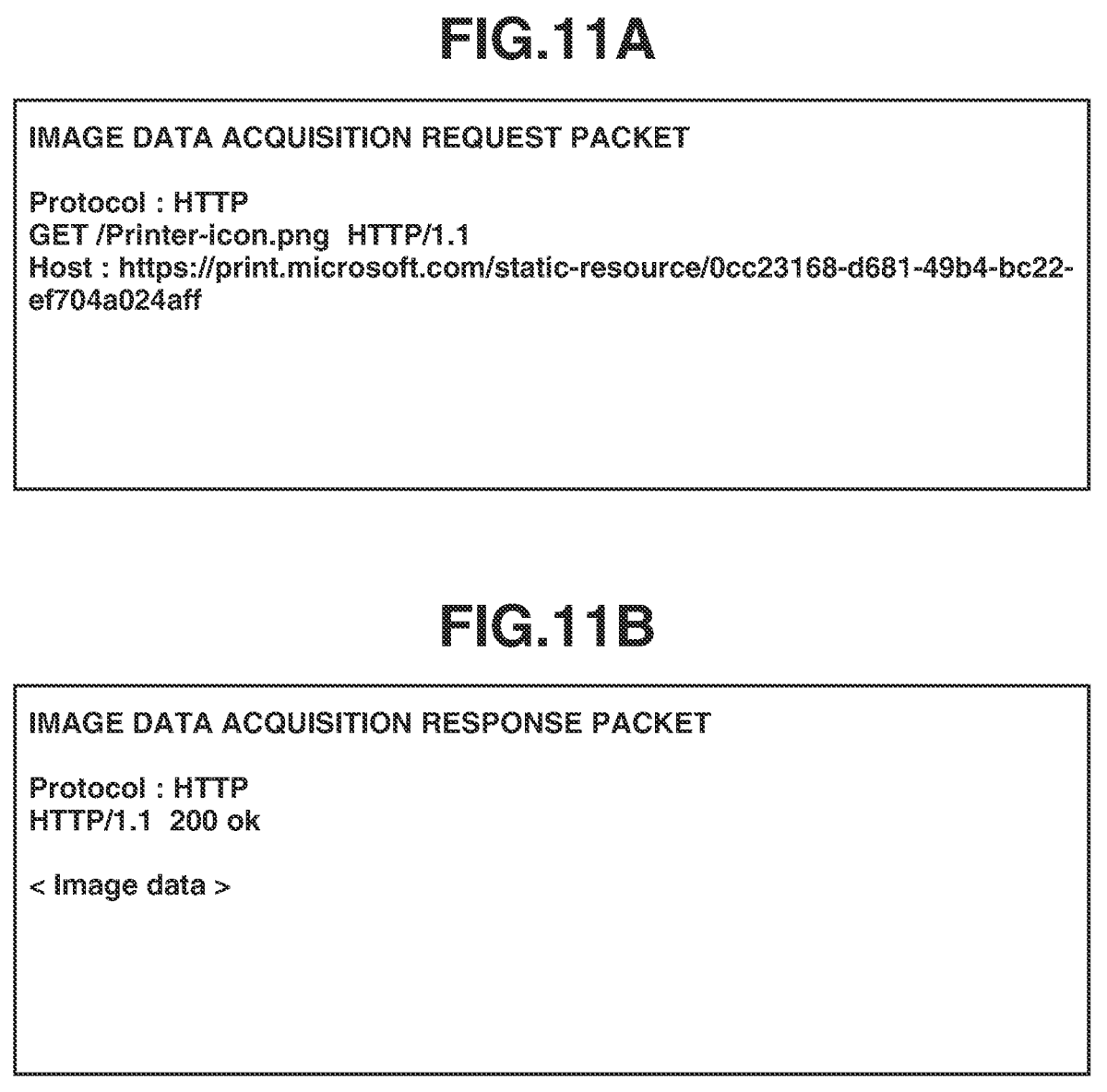

IMAGE DATA ACQUISITION REQUEST PACKET

Protocol : HTTP
GET /Printer-icon.png HTTP/1.1
Host : https://print.microsoft.com/static-resource/0cc23168-d681-49b4-bc22-ef704a024aff

FIG.11B

IMAGE DATA ACQUISITION RESPONSE PACKET

Protocol : HTTP
HTTP/1.1 200 ok

< Image data >

FIG.13A
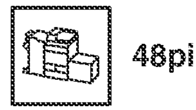
48pixel
FIG.13B
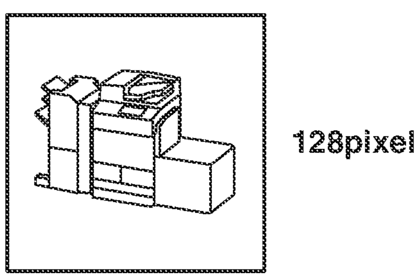
128pixel
FIG.13C
512pixel
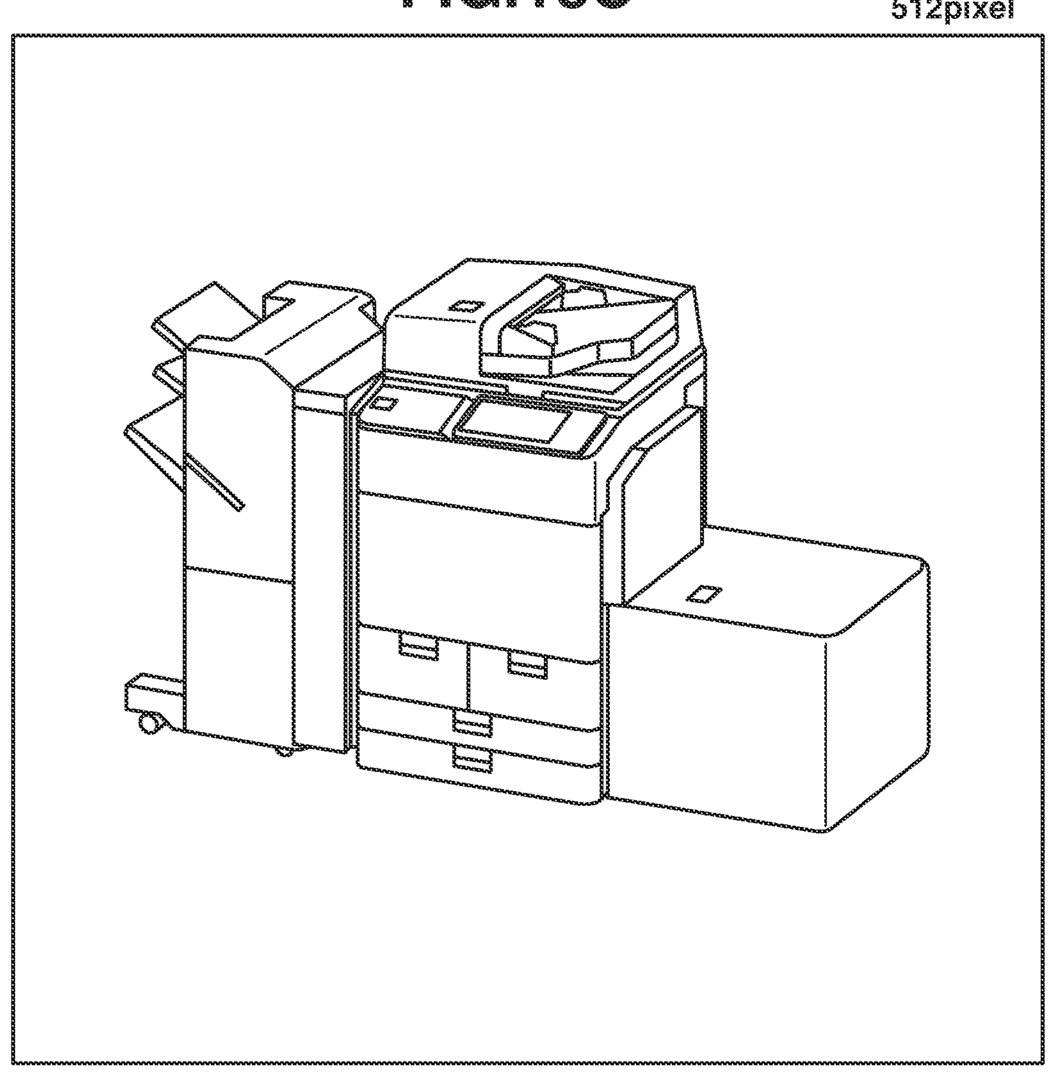

FIG.14A

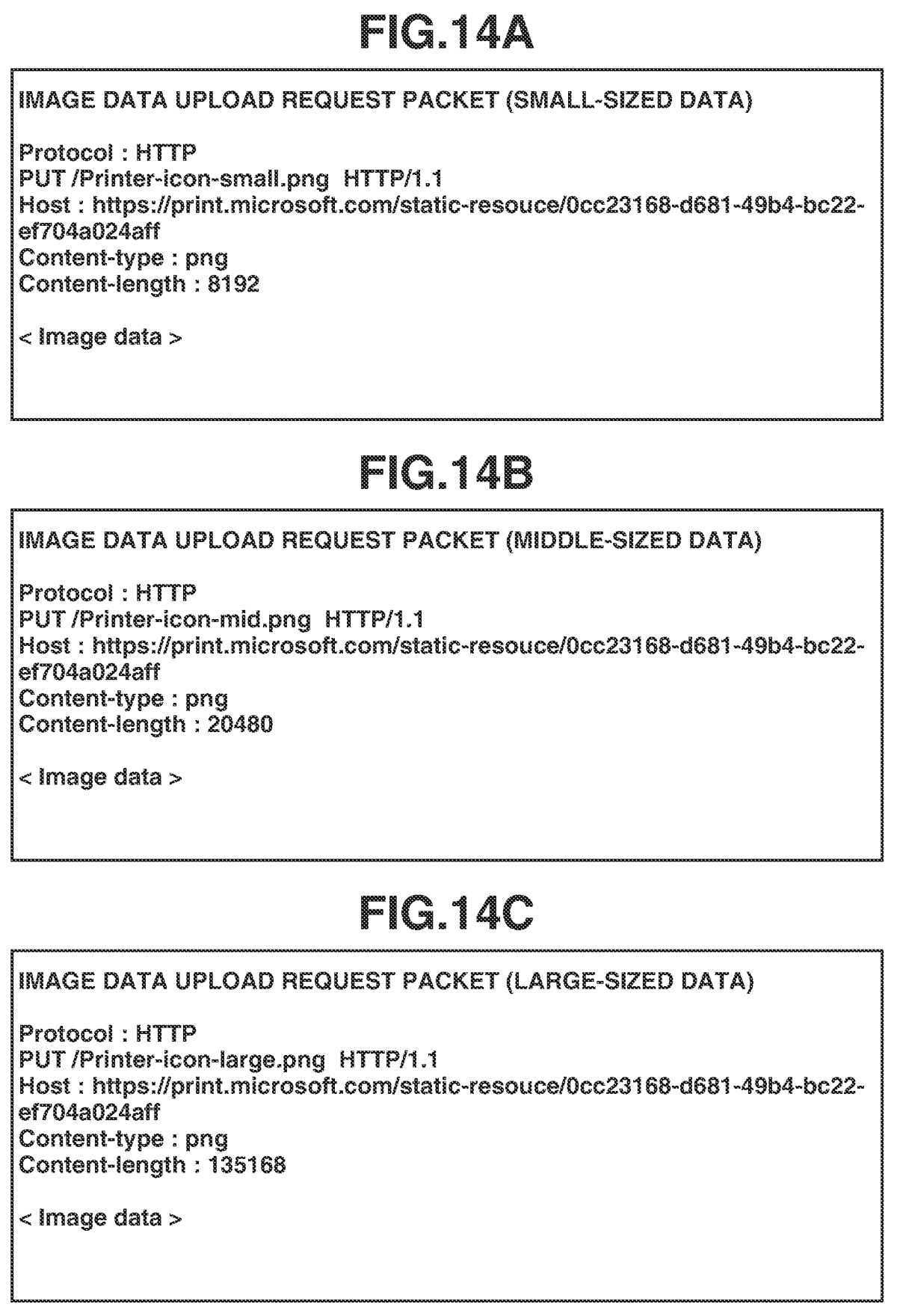

IMAGE DATA UPLOAD REQUEST PACKET (SMALL-SIZED DATA)

Protocol : HTTP
PUT /Printer-icon-small.png HTTP/1.1
Host : https://print.microsoft.com/static-resouce/0cc23168-d681-49b4-bc22-ef704a024aff
Content-type : png
Content-length : 8192

< Image data >

FIG.14B

IMAGE DATA UPLOAD REQUEST PACKET (MIDDLE-SIZED DATA)

Protocol : HTTP
PUT /Printer-icon-mid.png HTTP/1.1
Host : https://print.microsoft.com/static-resouce/0cc23168-d681-49b4-bc22-ef704a024aff
Content-type : png
Content-length : 20480

< Image data >

FIG.14C

IMAGE DATA UPLOAD REQUEST PACKET (LARGE-SIZED DATA)

Protocol : HTTP
PUT /Printer-icon-large.png HTTP/1.1
Host : https://print.microsoft.com/static-resouce/0cc23168-d681-49b4-bc22-ef704a024aff
Content-type : png
Content-length : 135168

< Image data >

FIG.15A

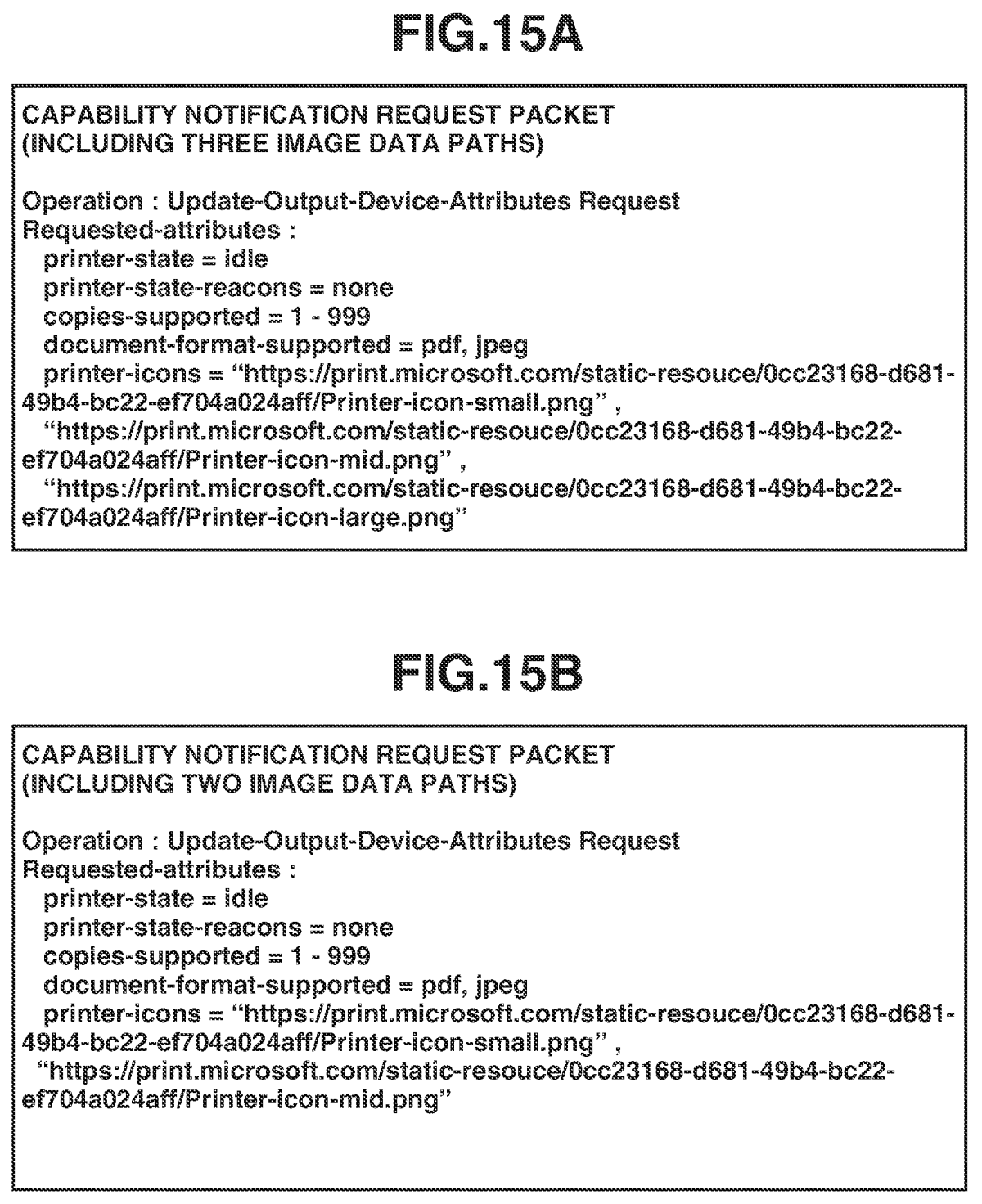

CAPABILITY NOTIFICATION REQUEST PACKET
(INCLUDING THREE IMAGE DATA PATHS)

Operation : Update-Output-Device-Attributes Request
Requested-attributes :
printer-state = idle
printer-state-reacons = none
copies-supported = 1 - 999
document-format-supported = pdf, jpeg
printer-icons = “https://print.microsoft.com/static-resouce/0cc23168-d681-49b4-bc22-ef704a024aff/Printer-icon-small.png” ,
“https://print.microsoft.com/static-resouce/0cc23168-d681-49b4-bc22-ef704a024aff/Printer-icon-mid.png” ,
“https://print.microsoft.com/static-resouce/0cc23168-d681-49b4-bc22-ef704a024aff/Printer-icon-large.png”

FIG.15B

CAPABILITY NOTIFICATION REQUEST PACKET
(INCLUDING TWO IMAGE DATA PATHS)

Operation : Update-Output-Device-Attributes Request
Requested-attributes :
printer-state = idle
printer-state-reacons = none
copies-supported = 1 - 999
document-format-supported = pdf, jpeg
printer-icons = “https://print.microsoft.com/static-resouce/0cc23168-d681-49b4-bc22-ef704a024aff/Printer-icon-small.png” ,
“https://print.microsoft.com/static-resouce/0cc23168-d681-49b4-bc22-ef704a024aff/Printer-icon-mid.png”

FIG.15C

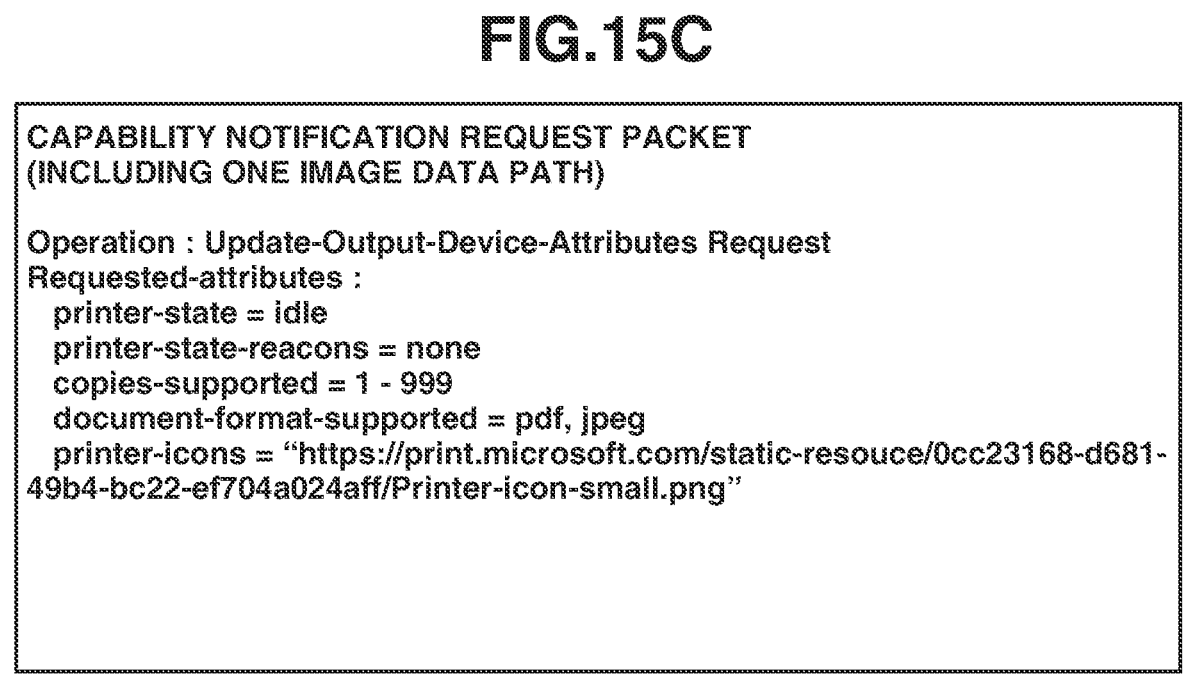

CAPABILITY NOTIFICATION REQUEST PACKET
(INCLUDING ONE IMAGE DATA PATH)

Operation : Update-Output-Device-Attributes Request
Requested-attributes :
printer-state = idle
printer-state-reacons = none
copies-supported = 1 - 999
document-format-supported = pdf, jpeg
printer-icons = "https://print.microsoft.com/static-resouce/0cc23168-d681-49b4-bc22-ef704a024aff/Printer-icon-small.png"

FIG.16A

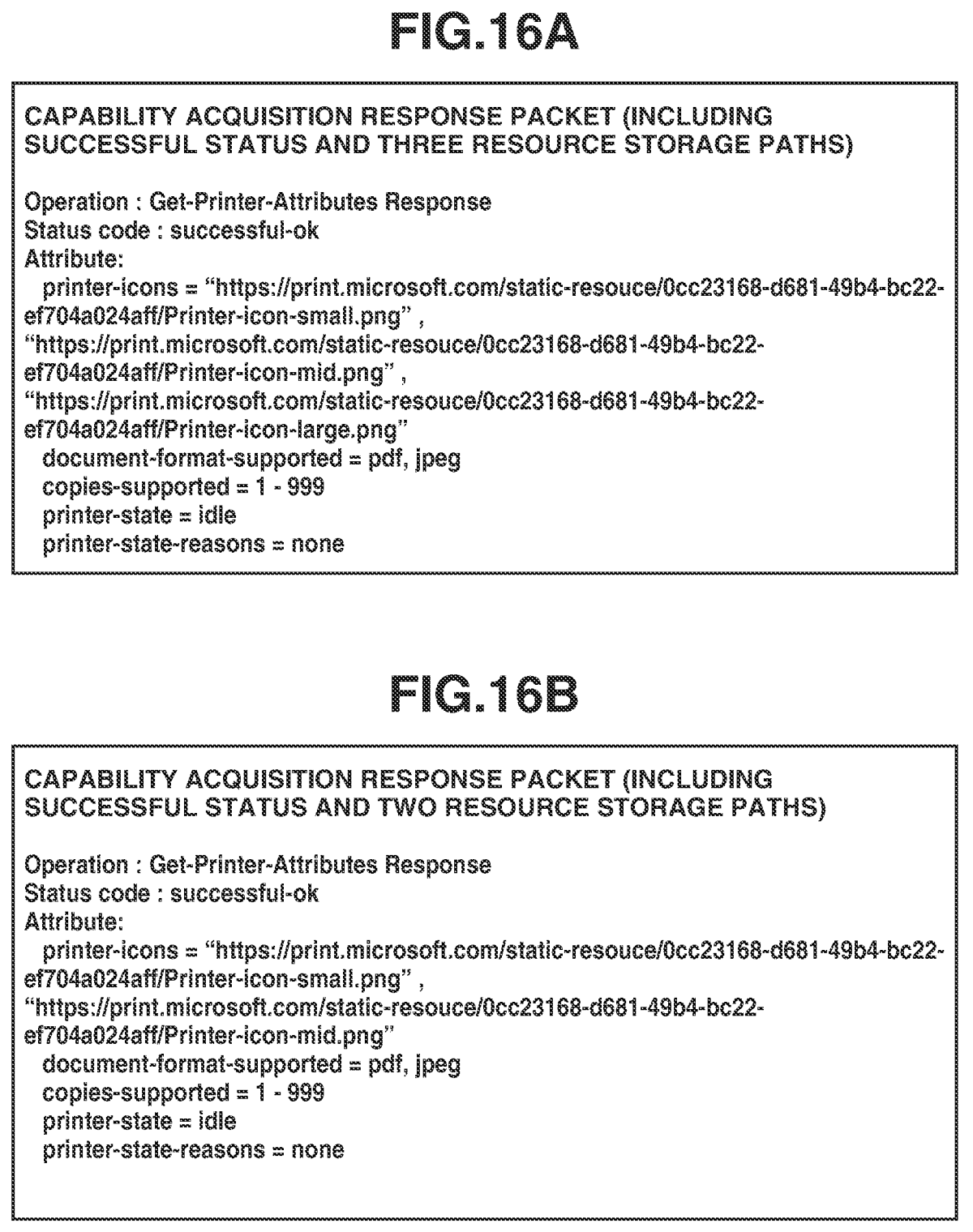

CAPABILITY ACQUISITION RESPONSE PACKET (INCLUDING SUCCESSFUL STATUS AND THREE RESOURCE STORAGE PATHS)

Operation : Get-Printer-Attributes Response
Status code : successful-ok
Attribute:
printer-icons = "https://print.microsoft.com/static-resouce/0cc23168-d681-49b4-bc22-ef704a024aff/Printer-icon-small.png" , "https://print.microsoft.com/static-resouce/0cc23168-d681-49b4-bc22-ef704a024aff/Printer-icon-mid.png" , "https://print.microsoft.com/static-resouce/0cc23168-d681-49b4-bc22-ef704a024aff/Printer-icon-large.png"
document-format-supported = pdf, jpeg
copies-supported = 1 - 999
printer-state = idle
printer-state-reasons = none

FIG.16B

CAPABILITY ACQUISITION RESPONSE PACKET (INCLUDING SUCCESSFUL STATUS AND TWO RESOURCE STORAGE PATHS)

Operation : Get-Printer-Attributes Response
Status code : successful-ok
Attribute:
printer-icons = "https://print.microsoft.com/static-resouce/0cc23168-d681-49b4-bc22-ef704a024aff/Printer-icon-small.png" , "https://print.microsoft.com/static-resouce/0cc23168-d681-49b4-bc22-ef704a024aff/Printer-icon-mid.png"
document-format-supported = pdf, jpeg
copies-supported = 1 - 999
printer-state = idle
printer-state-reasons = none

FIG.16C

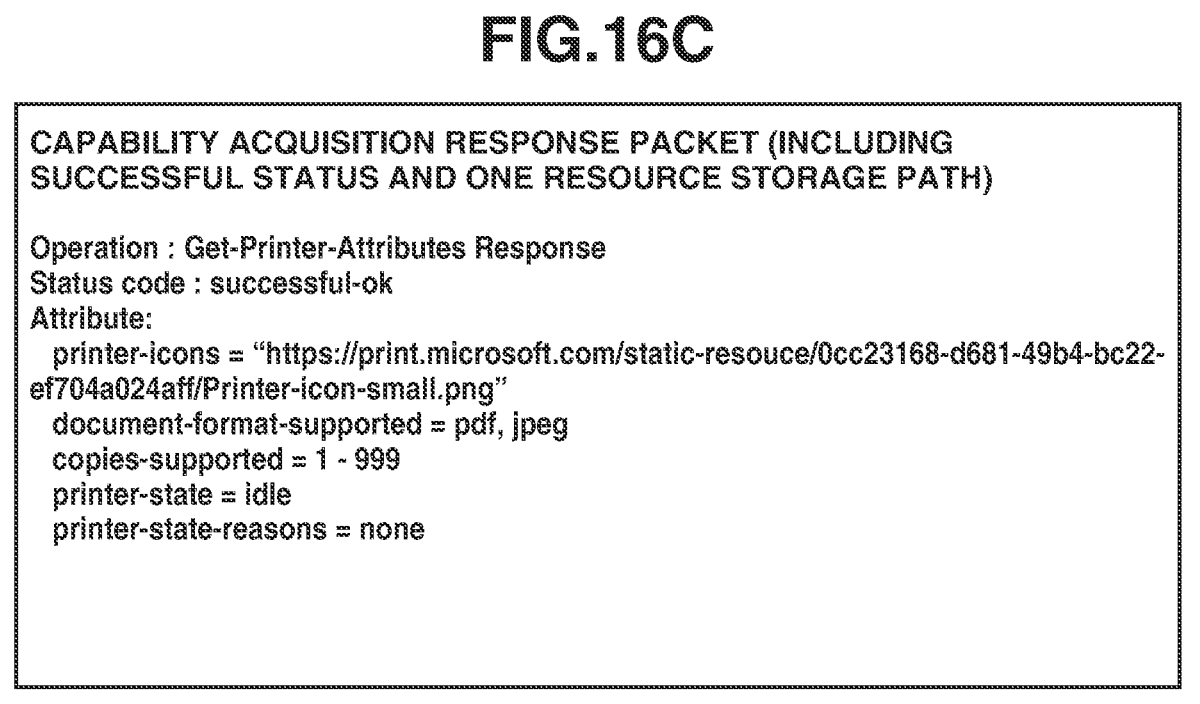

CAPABILITY ACQUISITION RESPONSE PACKET (INCLUDING SUCCESSFUL STATUS AND ONE RESOURCE STORAGE PATH)

Operation : Get-Printer-Attributes Response
Status code : successful-ok
Attribute:
printer-icons = "https://print.microsoft.com/static-resouce/0cc23168-d681-49b4-bc22-ef704a024aff/Printer-icon-small.png"
document-format-supported = pdf, jpeg
copies-supported = 1 - 999
printer-state = idle
printer-state-reasons = none

PRINTING APPARATUS, CONTROL METHOD, AND STORAGE MEDIUM

BACKGROUND

Field of the Disclosure

The present disclosure relates to a printing apparatus that collaborates with a print service via the Internet, a control method, and a storage medium.

Description of the Related Art

In recent years, there has been an increase in the use of cloud print service methods for inputting a print job and transmitting the print job to a printing apparatus via a cloud (Japanese Patent Application Laid-Open No. 2012-133489). In such a printing system, an administrator initially registers printing apparatuses to a cloud print service (hereinafter also referred to as a print service or CPS) to which the administrator belongs. Then, users permitted to use the CPS select a printing apparatus registered in the CPS as an output printer by using their client terminals, set desired print settings, and transmit a print job to the CPS. When the CPS receives the print job, the CPS transfers the print job to the printing apparatus. The printing apparatus performs printing based on the transferred print job.

These cloud print service methods are prescribed in PWG5100.13, PWG5100.18, RFC3995, and RFC3996, where a printing protocol called Internet Printing Protocol (IPP) is defined. These standards prescribe a technique in which a printing apparatus acquires the Uniform Resource Locator (URL) of a server for storing image icon data of the printing apparatus from the CPS by using IPP. The printing apparatus uploads the image icon data of the printing apparatus to the acquired icon data storage server and notifies the CPS of the storage destination URL path information. Each client terminal acquires the URL path information from the CPS and acquires the image icon data from the icon data storage server, making it easier for the user to identify a printer when performing a printer search.

SUMMARY

According to embodiments of the present disclosure, a printing apparatus capable of, upon reception of a request for registering a printing apparatus, registering the printing apparatus, and, upon reception of an instruction for performing printing on the registered printing apparatus, performing communication via the Internet and a print service for providing the printing apparatus with a print job, the printing apparatus includes at least one first processor and at least one first memory coupled to the first processor and having stored thereon instructions, when executed by the first processor, cooperating to act as: a reception unit configured to receive storage information for storing icon image data of the printing apparatus from the print service, a storage unit configured to store the icon image data of the printing apparatus based on the storage information, and a notification unit configured to, when notifying the print service of capability information of the printing apparatus, notify the print service of the capability information including path information of the stored icon image data of the printing apparatus.

Further features of the present disclosure will become apparent from the following description of exemplary embodiments with reference to the attached drawings.

BRIEF DESCRIPTION OF THE DRAWINGS

FIG. 1 is a diagram illustrating an example of a printing system.

FIGS. 6A and 6B are diagrams illustrating examples of registration packets for registering the printing apparatus.

FIGS. 7A to 7D are diagrams illustrating examples of packets for acquiring capability information for a cloud print service.

FIGS. 8A to 8C are diagrams illustrating examples of packets for uploading image icon data.

FIGS. 9A to 9C are diagrams illustrating examples of packets for transmitting a capability notification to the cloud print service.

FIGS. 10A to 10C are diagrams illustrating examples of packets for acquiring capability information of a printing apparatus registered in the cloud print service.

FIGS. 11A and 11B are diagrams illustrating examples of packets for acquiring the image icon data.

FIGS. 13A to 13C are diagrams illustrating examples of image icon data stored in the printing apparatus according to the second exemplary embodiment.

FIGS. 14A to 14C are diagrams illustrating examples of packets for uploading the image icon data according to the second exemplary embodiment.

FIGS. 15A to 15C are diagrams illustrating examples of packets for transmitting a capability notification to a cloud print service according to the second exemplary embodiment.

FIGS. 16A to 16C are diagrams illustrating examples of packets for acquiring capability information for a printing apparatus registered in the cloud print service according to the second exemplary embodiment.

DESCRIPTION OF THE EMBODIMENTS

Figure 2:
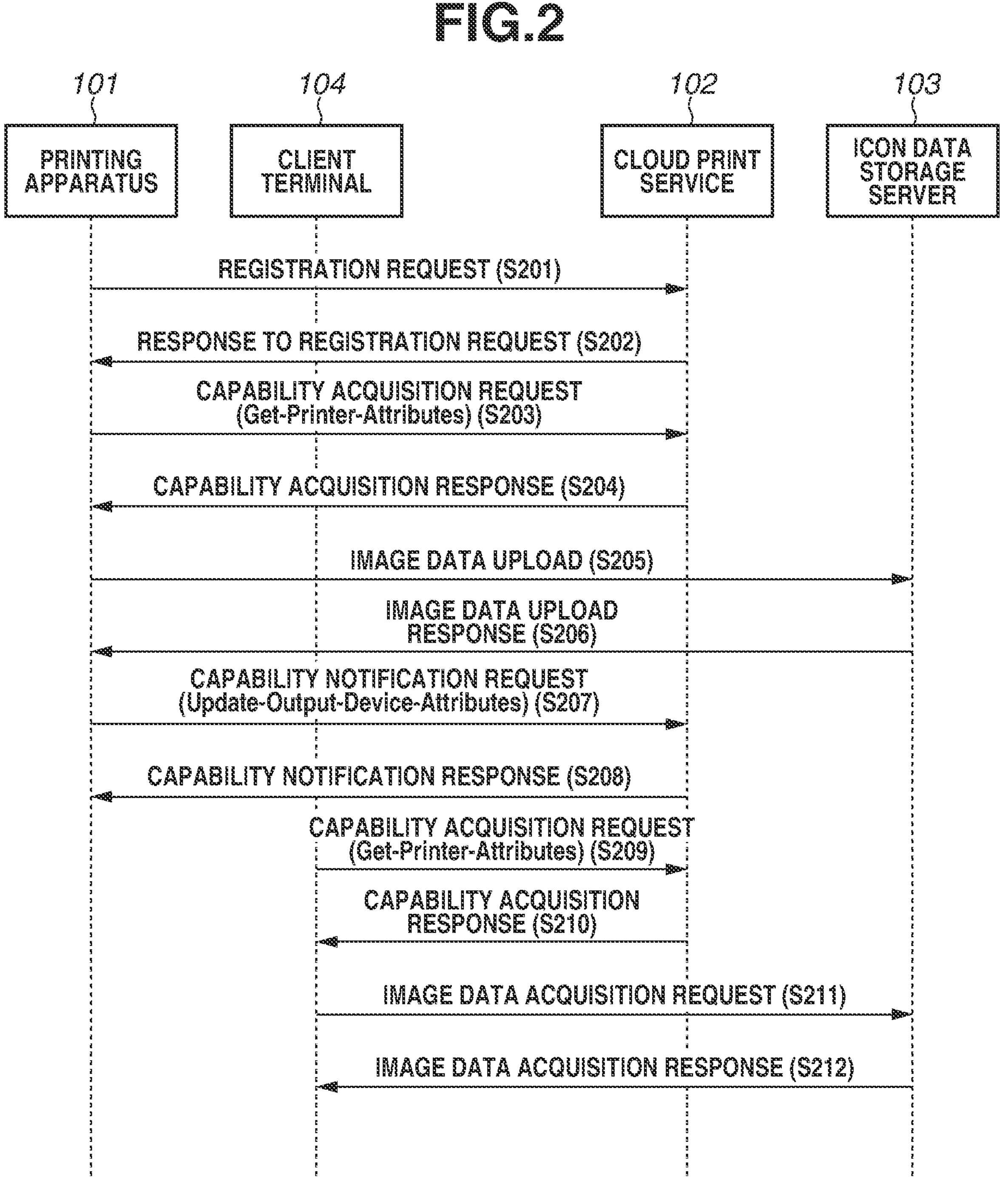
FIG. 2 is an example of a sequence diagram illustrating image icon transmission of a printing apparatus.

When a printing apparatus uploads image icon data to a storage server, the upload operation may fail. For example, the upload operation may fail if the capacity of the data stored in an icon data storage server reaches an upper limit or if a temporary server internal error occurs. In a case where the upload operation fails in this way, if the printing apparatus notifies the CPS of the uniform resource locator (URL) path information, and a client terminal transmits an image icon data acquisition request to the URL, the image icon data acquisition will fail because no image icon data is stored. There has been an issue that the communication traffic volume and communication bands are wastefully consumed by communication occurring between the client terminal and the icon data storage server.

There has been another issue of excessive time required in user operations due to additional time taken for printer search and printer addition, relevant to the time duration of redundant communication.

Embodiments of the present disclosure have been embodied in view of the above-described issues. Embodiments of the present disclosure are directed to providing a method for determining and controlling whether the printing apparatus notifies the CPS of the storage destination URL path information according to the success in storing the image icon data.

Exemplary embodiments of the present disclosure will be described below with reference to the accompanying drawings. The following exemplary embodiments do not limit the present disclosure. Not all of the combinations of the features described in the exemplary embodiments are indispensable to the solutions for the present disclosure.

Figure 1:
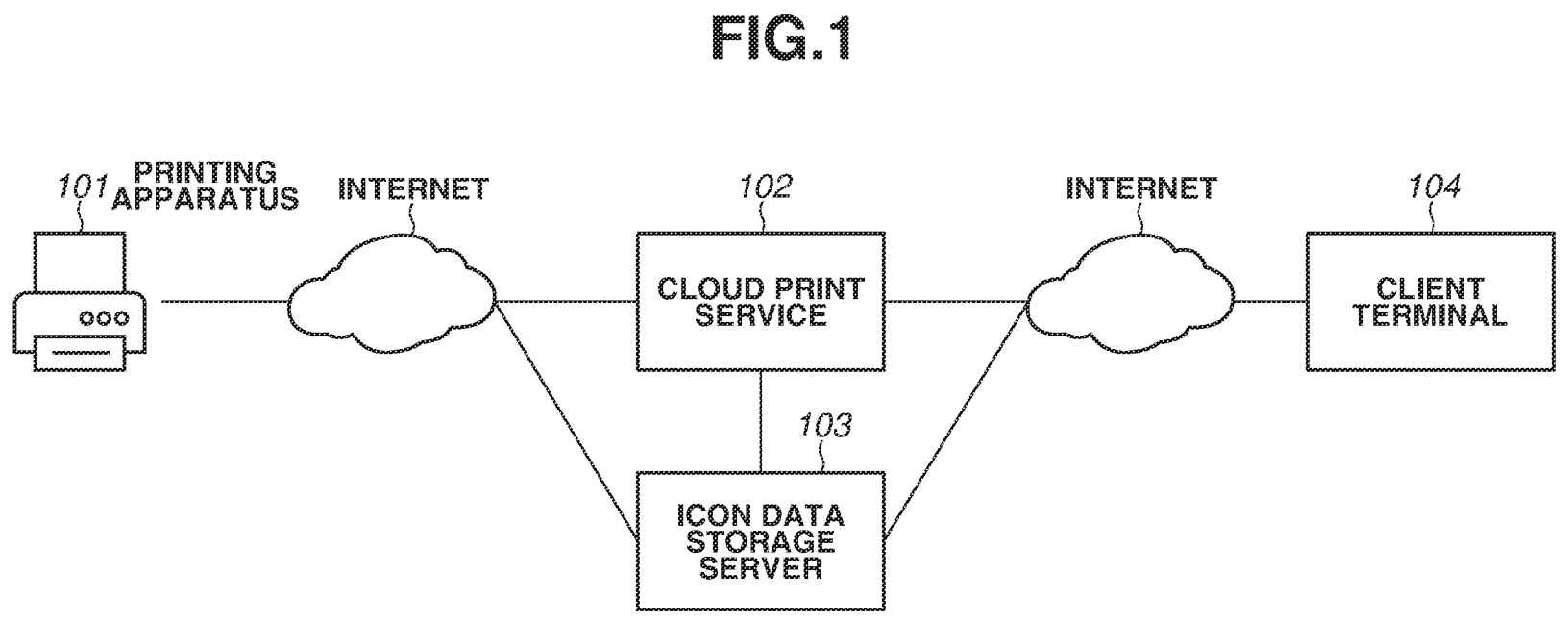

First, a configuration of a printing system according to the present disclosure will be described below with reference to FIG. 1. The printing system according to a first exemplary embodiment includes a printing apparatus 101, a client terminal 104, a cloud print service (hereinafter also referred to as a print service or CPS) 102, and an icon data storage server 103. The printing apparatus 101 communicates with the CPS 102 and the icon data storage server 103 on the Internet via a network. The network 100 may be formed of a combination of a communication network such as a Local Area Network (LAN) and Wide Area Network (WAN), a cellular network such as Long Term Evolution (LTE) and 5th Generation (5G), and a wireless network conforming to Institute of Electrical and Electronics Engineers (IEEE) 802.11. More specifically, any communication method of the physical layer is applicable as long as the network 100 is capable of data transmission and reception. The client terminal 104 also communicates with the CPS 102 and the icon data storage server 103 on the Internet via a communication network or a cellular network. The CPS 102 and the icon data storage server 103 also communicate with each other via a network.

The printing apparatus 101 has a scanning function for reading an image by using a scanner and transmitting the image data to the outside, a printing function for printing an image on a sheet such as paper based on a print job received from an external apparatus, and a copy function. The printing apparatus 101 can also receive a print job via the CPS 102 and perform printing. Although the present exemplary embodiment has been described above centering on a multi function peripheral (MFP) having a plurality of functions as an example of a printing apparatus, the present disclosure is not limited thereto. For example, a single function peripheral (SFP) having only a printing function is also applicable. Although the present exemplary embodiment will be described below centering on an example where printing is made on a sheet such as paper, the present exemplary embodiment is not limited thereto but is also applicable to printing control, for example, in three-dimensional (3D) printing for molding a solid object based on three-dimensionally shaped data.

The printing apparatus 101 according to the present exemplary embodiment has a user management function. If the user management function is enabled as an operation setting of the printing apparatus 101, the user performs authentication on the printing apparatus 101, and logs into the printing apparatus 101 to use the functions of the printing apparatus 101 (the functions will be described in detail below). The printing apparatus 101 has a hold printing function intending for preventing a print product from being taken away by a third person or misprinted. The hold printing function refers to a function of temporarily storing data in a storage, without printing the data upon reception of a print job by the printing apparatus, and printing the data upon reception of a subsequent print instruction from the user. If the hold printing function is enabled, the printing apparatus prints the print job of the user after the user successfully logs into the printing apparatus.

The CPS 102 receives a print job from a client terminal such as the client terminal 104 and stores the print job. Subsequently, the CPS 102 notifies the printing apparatus 101 registered in the CPS 102 that a print job is input. Upon reception of the notification, the printing apparatus 101 acquires the print job and temporarily stores the print job in a storage. The print job stored in the printing apparatus 101 is printed when the user logs into the printing apparatus 101 and then the printing apparatus 101 receives an operation for starting printing.

The icon data storage server 103 stores the image icon data expressing the appearance of the printing apparatus 101 (hereinafter the image icon data is also simply referred to as an icon). The stored icon is provided from the printing apparatus 101 to the icon data storage server 103. After storing the icon, the icon data storage server 103 provides the printing apparatus 101 with URL information as a storage path for providing icons. The client terminal 104 can acquire icon data based on the URL information. The icon data will be described in detail below. Although, in the present exemplary embodiment, the CPS 102 and the icon data storage server 103 have been described above as different servers, the present disclosure is not limited thereto. The effect of embodiments of the present disclosure can be obtained even with a single server configuration having the functions of the two servers.

Although FIG. 1 illustrates each of the CPS 102 and the icon data storage server 103 configured as one server, these servers do not necessarily need to be configured as one server since the servers are assumed to be provided as cloud services. The servers are implemented by a system including a plurality of apparatuses.

<Hardware Configuration of Printing Apparatus 101>

Figure 4:
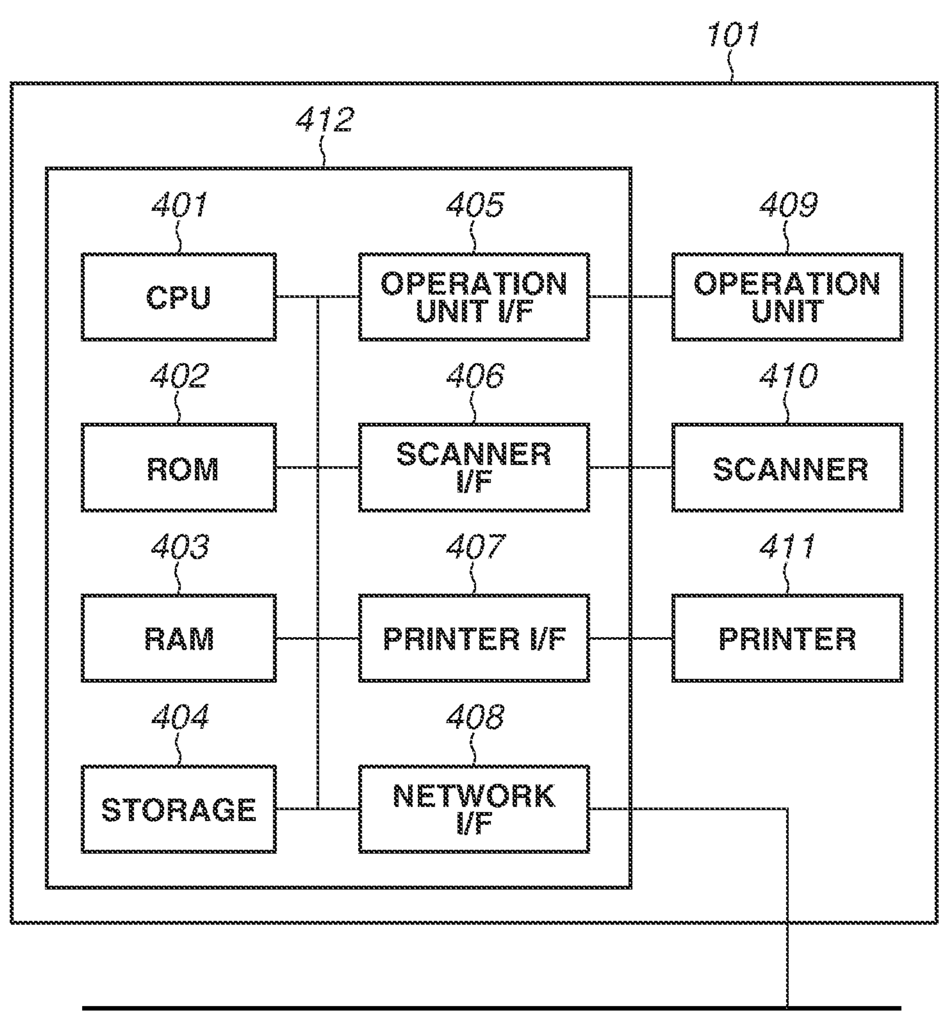
FIG. 4 is a block diagram illustrating an example of a hardware configuration of the printing apparatus.

A hardware configuration of the printing apparatus 101 according to the present exemplary embodiment will be described below with reference to FIG. 4. FIG. 4 is a block diagram illustrating the hardware configuration of the printing apparatus 101. The printing apparatus 101 has a reading function for reading an image on a sheet, and a file transmission function for transmitting the read image to an external communication apparatus. The printing apparatus 101 also has a printing function for printing an image on a sheet, and another printing function for receiving a print job from the CPS 102 and performing printing.

A control unit 110 including a central processing unit (CPU) 401 controls overall operations of the printing apparatus 101. The CPU 401 reads a control program stored in a read-only memory (ROM) 402 or a storage 404 and performs printing control, reading control, and other various types of control. The ROM 402 stores control programs executable by the CPU 401. A random access memory (RAM) 403 is the main memory accessed by the CPU 401 and is used as a work area or a temporary storage area for loading various control programs. The storage 404 stores print jobs, image data, various programs, and various setting information. The hardware components including the CPU 401, the ROM 402, the RAM 403, and the storage 404 configure a computer.

Although, in the printing apparatus 101 according to the present exemplary embodiment, one CPU 401 executes each piece of processing illustrated in flowcharts (described below) by using one memory (RAM 403), other configurations are also applicable. For example, a plurality of processors, memories, or storages may be cooperatively operated to perform each piece of processing illustrated in flowcharts (described below). The above-described processing may be partly executed by hardware circuitry.

A printer interface (I/F) 407 connects a printer 411 (printer engine) and the control unit 110. The printing apparatus 101 generates a print image and a print control command to be transferred to the printer 411, based on a print job. The printer 411 prints an image on a sheet supplied from a sheet cassette (not illustrated), based on the print image and the print control command input via the printer I/F 407. Applicable printing methods include an electrophotographic process in which toner is transferred onto a sheet to be fixed, and an inkjet method in which ink is discharged onto a sheet.

A scanner I/F 406 connects a scanner 410 and the control unit 110. The scanner 410 reads a document placed on a document positioning plate (no illustrated) and generates image data. The image data generated by the scanner 410 is printed by the printer 411, stored in the storage 404, or transmitted to an external apparatus via a network I/F 408.

An operation unit I/F 405 connects an operation unit 409 and the control unit 110. The operation unit 409 is provided with a liquid crystal display (LCD) having a touch panel function and various hardware keys. The operation unit 409 functions as a display unit for displaying information and a reception unit for receiving user instructions. The CPU 401 controls information display and user operation reception in collaboration with the operation unit 409.

The network I/F 408 is connected with a network cable to communicate with an external apparatus on the network 100 and the Internet. Although the present exemplary embodiment assumes that the network I/F 408 is a communication I/F that performs wire communication conforming to Ethernet (registered trademark), the present disclosure is not limited thereto. For example, the network I/F 408 may be a wireless communication I/F conforming to IEEE 802.11 Series. The network I/F 408 may also be a communication I/F that performs mobile communication including 3rd Generation (3G) communication such as Code Division Multiple Access (CDMA), 4th Generation (4G) communication such as LTE, and 5th Generation New Radio (5G NR) communication.

<Hardware Configurations of CPS 102, Icon Data Storage Server 103, and Client Terminal 104>

Figure 17:
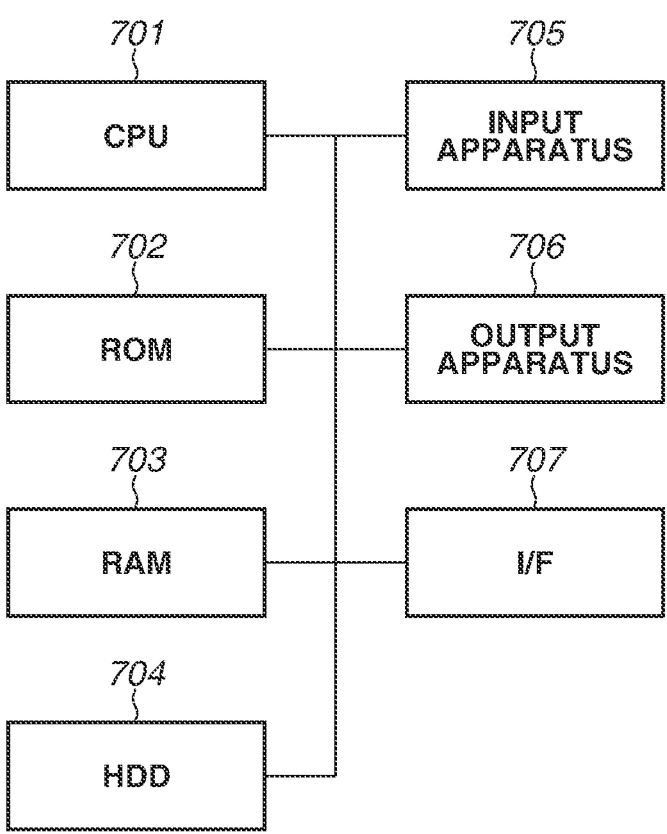
FIG. 17 is a block diagram illustrating an example of hardware configurations of a server and a client terminal.

FIG. 17 is a block diagram schematically illustrating hardware configurations of the CPS 102, the icon data storage server 103, and the client terminal 104. Referring to FIG. 17, a CPU 701 directly or indirectly controls devices (such as a ROM and RAM) connected via an internal bus to execute programs for implementing embodiments of the present disclosure. The ROM 702 stores the Basic Input/Output System (BIOS). A RAM (direct storage device) 703 is used as a work area for the CPU 701 or a temporary storage area. An indirect storage device 704 includes a hard disk drive (HDD) or solid state drive (SDD) storing an operating system (OS) as basic software, applications, and software modules. An input apparatus 705 includes a keyboard and a pointing device. An output apparatus 706 includes, for example, a display.

A network I/F 707, an interface for connecting with a network, may be a non-Ethernet-based communication interface like the network I/F 408 illustrated in FIG. 4.

<Printer Registration and Use of Icons>

A sequence for icon registration according to the present exemplary embodiment will be described below with reference to FIG. 2. For control similar to the general sequence described above with reference to FIG. 1, a description will be suitably omitted. Packets to be transmitted in this sequence, not described in detail below with reference to FIG. 2, will be described below with reference to different drawings.

First, the printing apparatus 101 registers a printing apparatus to the CPS 102 to use the cloud print service according to the present exemplary embodiment. When the user operates the operation unit 409 of the printing apparatus 101 to perform a cloud print service registration operation (not illustrated), then in step S201, the printing apparatus 101 connects with the CPS 102 as a registration destination and then transmits a registration request packet to the CPU 102. When the registration is completed, then in step S202, the CPS 102 transmits a response packet to the registration request to respond to the registration request.

FIGS. 6A and 6B illustrate examples of IPP packets transmitted in steps S201 and S202, respectively.

FIG. 6A illustrates a registration request packet including operation information "Operation: Register-Output-Device Request" as a registration request, and the attribute information. The attribute information includes, for example, "Requested-attributes: manufacture="Canon"model="iR-ADV" as manufacturer and model information. FIG. 6B illustrates a response packet to the registration request including operation information "Operation: Register-Output-Device Response", and status information "Status Code: successful-ok". The response packet to the registration request further includes attribute information, for example, "Attribute: Cloud-apparatus-id='Occ23168-d681-49b4-bc22-ef704a024aff'" as identification information. The CPS 102 issues identification information for the registered device and transmits the information as attribute information. With the above-described processing, the printing apparatus 101 is registered as an apparatus supporting the cloud print service, in the CPS 102.

In step S203, the printing apparatus 101 transmits a capability acquisition request packet to the CPS 102 to make an inquiry about capability information currently registered in the CPS 102. In step S204, in response to the request in step S203, the CPS 102 transmits a capability acquisition response packet including the capability information currently registered in the CPS 102, to the printing apparatus 101. The processing for making an inquiry about the capability information and returning the information in steps S203 and S204, respectively, enables the printing apparatus 101 to acquire the URL information of the server that can store the icon data, from the CPS 102. Upon reception of the capability acquisition request, the CPS 102 issues the URL information for storing the icon data corresponding to the printing apparatus 101. Although, in the present exemplary embodiments, the printing apparatus 101 acquires the URL information by issuing a capability acquisition request, the printing apparatus 101 may acquire the information by a request other than the capability acquisition request. The storage information of the server that can store the icon data is not limited to the URL but may be any form of information as long as the storage location can be identified.

In step S205, the printing apparatus 101 transmits an image data upload request packet to the icon data storage server 103 based on the information acquired in step S204 to request the icon data storage server 103 to update the image data. In step S206, in response to the request from the printing apparatus 101, the icon data storage server 103 issues an image data upload response packet to return the icon storage status to the printing apparatus 101.

In step S207, the printing apparatus 101 transmits a capability notification request packet to the CPS 102 to request the CPS 102 to update the capability information of the printing apparatus 101 including the URL information for the icon data. In step S208, in response to the capability notification request from the printing apparatus 101, the CPS 102 transmits a response packet to the capability notification request. When a series of sequences normally operates, the icons of the printing apparatus 101 are stored in the icon data storage server 103, and the URL information of the icon data is registered in the CPS 102 as the capability information of the printing apparatus 101. The CPS 102 can register a plurality of printing apparatuses. Information about the plurality of printing apparatuses is registered in the CPS 102 through a series of processing in steps S201 to S208.

In step S209, the client terminal 104 transmits a capability acquisition request packet to the CPS 102 to acquire the capability information of the registered printing apparatuses. In step S210, in response to the request in step S209, the CPS 102 transmits the capability information of the printing apparatus 101 including the URL information of the icon data via a capability acquisition response packet. FIGS. 10A to 10C illustrate examples of IPP packets transmitted in steps S209 and S210, respectively. FIG. 10A illustrates a capability acquisition request packet transmitted from the client terminal 104 to the CPS 102 in step S209. This request packet includes operation information "Operation: Get-Printer-Attribute-Request". The client terminal 104 transmits the capability acquisition request packet after including printer icon information "Printer-icon" as request attribute information.

FIGS. 10B and 10C illustrate examples of capability acquisition response packets transmitted by the CPS 102 in step S210. FIG. 10B illustrates a capability acquisition response packet transmitted by the CPS 102 in response to the capability acquisition request packet. This response packet includes a successful status and the icon resource storage path information. The CPS 102 transmits this response packet after including the icon resource storage path information in the attribute information.

Attribute:

printer-icons="https://print.microsoft.com/static-resource/Occ23168-d681-49b4-bc22-ef704a024aff/Printer-icon.png"

FIG. 10C illustrates a capability acquisition response packet transmitted by the CPS 102 in response to the capability acquisition request packet. This response packet includes a successful status but does not include the icon resource storage path information. This attribute information does not include the icon resource storage path information illustrated in FIG. 10B.

Step S210 is executed when the client terminal 104 receives the response packet in FIG. 10B in step S211 and obtains the icon resource storage path information. In step S211, the client terminal 104 accesses the icon data storage server 103 based on the URL information of the icon data of the printing apparatus 101 obtained in step S210, and transmits an image data acquisition request packet to the icon data storage server 103 to request for the icon data. In step S212, in response to this request packet, the icon data storage server 103 transmits the icon data to the client terminal 104 via an image data acquisition response packet.

FIGS. 11A and 11B illustrate examples of packets communicated between the client terminal 104 and the icon data storage server 103 in steps S211 and S212, respectively. FIG. 11A illustrates an image data acquisition request packet transmitted from the client terminal 104 to the icon data storage server 103 to request for the icon data of the printing apparatus 101 through the GET operation in Hypertext Transfer Protocol (HTTP). The capability information of the printing apparatus 101 acquired in step S210 is used as a parameter of the GET operation.

Protocol: HTTP

GET/Printer-icon.png HTTP/1.1

Host: https://print.microsoft.com/static-resource/Occ23168-d681-49b4-bc22-ef704a024aff The icon data storage server 103 includes icon image electronic data in the image data acquisition response packet in FIG. 11B in an HTTP response, and transmits the image data acquisition response packet. The client terminal 104 acquires the icon data of the printing apparatus 101 through this series of processing. The client terminal 104 stores icon data in the RAM 703 and the indirect storage device 704 of the client terminal 104, allowing the OS and applications of the client terminal 104 to use the icons for identifying the printing apparatus 101.

Figure 3:
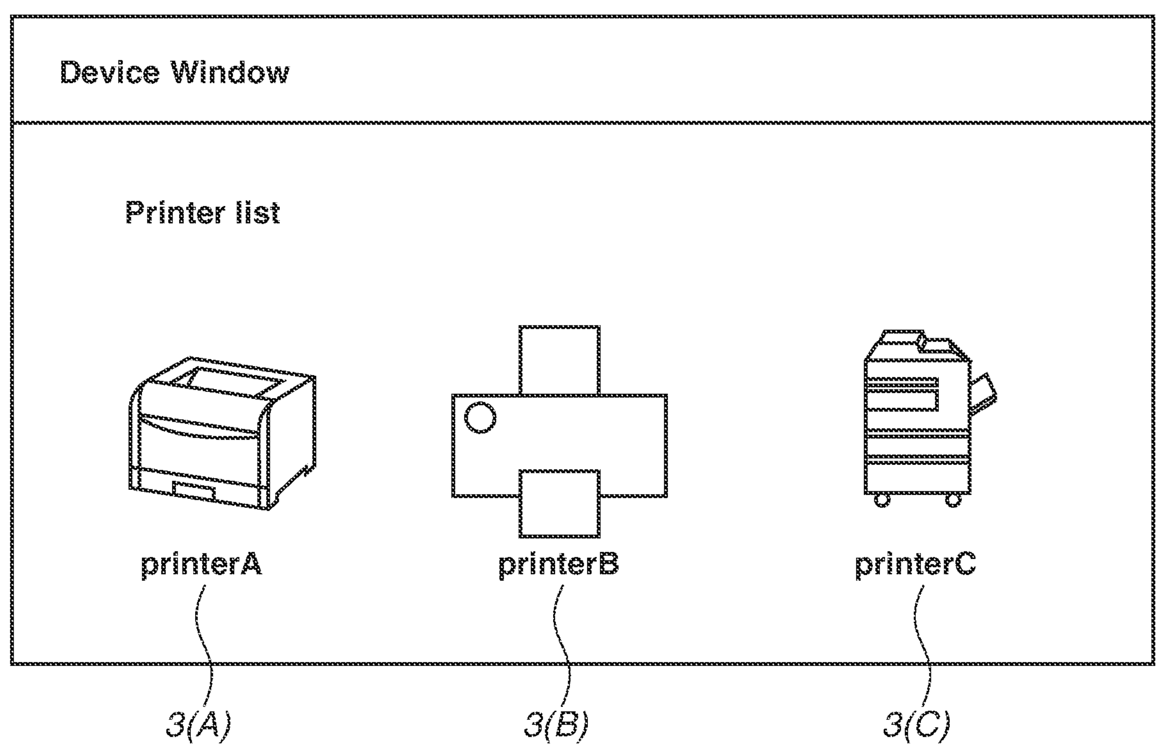
FIG. 3 illustrates an example of an operation screen of a client terminal having acquired the image icon data.

FIG. 3 illustrates an example of a printing apparatus selection screen in a print application operating on the client terminal 104. The user of the client terminal 104 activates the print application to perform printing. The print application displays a list of usable printing apparatuses from the printing apparatus selection screen in FIG. 3, together with the icon images in FIGS. 3A, 3B, and 3C, to prompt the user to select a usable printing apparatus. Printing apparatuses usable by the print application include printing apparatuses supporting not only the cloud print service but also Web Service for Device (WSD) and a local printing apparatus directly connected with the client terminal 104.

The OS of the client terminal 104 searches for printing apparatuses supporting different protocols such as WSD as well as the cloud print service and acquires information about the apparatuses detected in the search. If the printing apparatuses in FIGS. 3A and 3C support the cloud print service, the print application displays the icons in FIG. 3A an 3C by using the above-described icon data acquired in step S212. For example, if the printing apparatus in FIG. 3B is detected with the WSD protocol, and no icon is included in the apparatus information, the print application displays the icon of a general-purpose printing apparatus prepared by the OS.

The print application displays the icons of printing apparatuses supporting the cloud print service, as described above. This enables the user to recognize the difference in appearance of the target printing apparatus to easily identify the printing apparatus. The uses of the icons of the printing apparatus 101 supporting the cloud print service include the use in the processing for registering a printing apparatus to be used by the OS and print application of the client terminal 104. Displaying the icons in the registration screen of the OS enables the user to easily identify the printing apparatus to be registered.

<Icon Registration Processing>

Control performed by the printing apparatus 101 to request the CPS 102 to update the icons of the printing apparatus 101, described above with reference to steps S203 to S208 in the sequence diagram in FIG. 2, will be described below with reference to the flowchart in FIG. 5. Examples of packets to be specifically communicated in each control will be described below with reference to FIGS. 7A to 7D, 8A to 8C, and 9A to 9C.

When the printing apparatus 101 completes the registration to the CPS 102 through the processing in steps S201 and S202 in FIG. 2, the printing apparatus 101 starts processing for registering the icons to its capability information. The effect of embodiments of the present disclosure can also be obtained by performing this icon registration processing not only at the timing of the registration processing to the cloud print service but also at the timing when power of the printing apparatus 101 is turned ON or when a communication path with the icon data storage server 103 is established.

When the icon registration processing is started, then in step S501, the printing apparatus 101 transmits a capability acquisition request packet to the CPS 102. In step S502, the printing apparatus 101 receives a response packet to the capability acquisition request, from the CPS 102. FIGS. 7A to 7D illustrate examples of IPP packets communicated in the processing in steps S501 and S502. FIG. 7A illustrates a capability acquisition request packet including operation information "Operation: Get-Printer-Attribute-Request". The printing apparatus 101 adds the attribute information when transmitting this request packet. The capability acquisition request packet includes URL information "Requested-attributes: printer-static-resource-directory-uri" for storing the icon data as the attribute information.

FIGS. 7B, 7C, and 7D illustrate examples of IPP capability acquisition response packets transmitted from the CPS 102 to the printing apparatus 101. The CPS 102 changes information to be included in the response packets depending on the server settings and devise statuses. These capability acquisition response packets include operation information "Operation: Get-Printer-Attribute-Response", a status code indicating the successful and failed status, and the attribute information as required. FIG. 7B illustrates an example of a response packet used if a resource storage path for storing the icon data is present in the CPS 102. This response packet includes successful status code "Status code: successful-ok" and the attribute information. The attribute information includes the storage path information as URL information of storing resources.

Attribute:

printer-static-resource-directory-uri="https://print.microsoft.com/static-resource/Occ23168-d681-49b4-bc22-ef704a024aff"

FIG. 7C illustrates an example of a capability acquisition response packet transmitted by the CPS 102 in response to the capability acquisition request. This response packet includes a successful status but does not include the icon resource storage path information. This response packet returns the successful status code like the response packet in FIG. 7B but does not include the storage path information in the attribute information.

Status code: successful-ok

Attribute:

FIG. 7D illustrates an example of a response packet used if the operation for the capability acquisition request packet from the printing apparatus 101 fails. This response packet includes status code "Status code: server-error-busy" indicating the cause of the failure. Although this example indicates an error due to the busy status of the server, the response packet may include a status code indicating other errors.

The printing apparatus 101 analyzes the capability acquisition response packet received from the CPS 102 in step S502 to determine the result of the processing (successful or failed) according to the status code. If the printing apparatus 101 receives a packet including the failed status code like the example in FIG. 7D (NO in step S502), the processing proceeds to step S509. If the printing apparatus 101 receives the successful status code like the case in FIGS. 7B and 7C (YES in step S502), the processing proceeds to step S503. In step S503, the printing apparatus 101 determines whether the received capability acquisition response packet further includes the storage path information. If the attribute information does not include the storage path information like the case in FIG. 7C (NO in step S503), the processing proceeds to step S509. If the attribute information of the capability acquisition response packet includes the storage path information like the case in FIG. 7B (YES in step S503), the processing proceeds to step S504.

In steps S504 and S505, the printing apparatus 101 performs processing in steps S205 and S206 described above with reference to FIG. 2. In step S504, based on the storage path information included in the attribute information of the capability acquisition response packet received in step S502, the printing apparatus 101 connects with the icon data storage server 103 and issues an image data upload request to the icon data storage server 103. In step S505, the printing apparatus 101 receives a response to the image data upload request from the icon data storage server 103. FIGS. 8A to 8C illustrate examples of HTTP packets communicated between the printing apparatus 101 and the icon data storage server 103 in steps S504 and S505. FIG. 8A illustrates an image data upload request packet transmitted to the icon data storage server 103 by the printing apparatus 101 to request the icon data storage server 103 to update the icon data through the HTTP PUT operation.

Protocol: HTTP

PUT/Printer-icon. png HTTP/1.1

Host: https://print.microsoft.com/static-resourse/Occ23168-d681-49b4-bc22-ef704a024aff Content-type: png Content-length: 100

<Image data> (Actual image data is attached and transmitted)

As described above, the image data upload request packet includes name information, format information, and actual image data of the icon. In response to the request for updating the image data that changes according to the apparatus settings and statuses, the icon data storage server 103 responds to the printing apparatus 101 via an image data upload response packet. FIG. 8B illustrates an example of a response packet used if the updating of the icon data is successful. This response packet returns information stored together with the HTTP success response.

Protocol: HTTP

HTTP/1.1 201 Created

Content-Location:/Printer-icon.png

FIG. 8C illustrates an example of a response packet used if the updating of the icon data fails. This response packet returns information together with the cause of the failure.

Protocol: HTTP

HTTP/1.1 413 Payload Too Large

The above-described responses are examples of error responses having an error code exceeding the limit defined by the server. For example, a response having an error code indicating other failures such as "400 Bad Request" can also be used to indicate that the updating of the icon data has failed.

In step S505, the printing apparatus 101 analyzes the received image data upload response packet. If the updating fails as illustrated in FIG. 8C (NO in step S505), the processing proceeds to step S509. If the updating is successful as illustrated in FIG. 8B (YES in step S505), the processing proceeds to step S506.

Then, the printing apparatus 101 requests the CPS 102 to update its capability information held by the CPS 102, with which the icon images are stored in the icon data storage server 103. In step S506, in a case where the icon data in the icon data storage server 103 is successfully updated, the printing apparatus 101 includes the image data storage path information in the attribute information. Then, the processing proceeds to step S507. In step S509, in a case where the icon data storage server 103 fails in updating the icon data, the printing apparatus 101 does not include the image data storage path information in the attribute information. Then, the processing proceeds to step S507. In step S507, the printing apparatus 101 updates the capability information via the capability notification request packet to the CPS 102. Then, the processing proceeds to step S508.

In step S508, the printing apparatus 101 receives a response packet to the capability notification request from the CPS 102. Then, the processing exits the icon registration processing.

FIGS. 9A to 9C illustrate examples of IPP packets communicated in steps S507 and S508. FIG. 9A illustrates a capability notification request packet used when the printing apparatus 101 includes the image data storage path in the attribute information in step S506. This capability notification request packet includes the image data path information where the icon image data is stored, as the target attribute information.

Operation: Update-Output-Device-Attributes Request
Requested-attributes:
(snip)
printer-icons="https://print.microsoft.com/static-resourse/Occ23168-d681-49b4-bc22-ef704a024aff/Printer-icon.png"

FIG. 9B illustrates a capability notification request packet used when the printing apparatus 101 does not include the image data storage path in the attribute information in step S509. This capability notification request packet does not include the image data path information illustrated in FIG. 9A. Therefore, no icon image data of the printing apparatus 101 is newly added, or none of the existing image data is updated.

FIG. 9C illustrates a response packet to the capability notification request received by the printing apparatus 101 from the CPS 102. This response packet includes operation information "Operation: Update-Output-Device-Attributes Response" and a successful status code.

The above-described icon registration processing makes it possible to configure the capability information of the printing apparatus 101. If the processing for the image data storage path specified by the CPS 102 is successful, the capability information includes the image data path information. If the processing fails, the capability information does not include the image data path information.

The CPS 102 transmits a capability acquisition response packet described above with reference to step S210 in FIG. 2 according to the configuration of the capability information. More specifically, the CPS 102 returns the capability acquisition response packet in FIG. 10B if the capability acquisition request packet from the client terminal 104 includes the image data path information, or returns the capability acquisition response packet in FIG. 10C if the capability acquisition request packet does not include the relevant information. Further, when the client terminal 104 receives the response in FIG. 10B, the client terminal 104 accesses the icon data storage server 103 to acquire the icon data in steps S211 and S212 in FIG. 2. Although the above-described packets are based on the HTTP and IPP protocols, similar effects can also be obtained based on other communication protocols, such as File Transfer Protocol (FTP).

The above-described procedures enable a configuration for including the storage path information for the attribute information of the printing apparatus 101 according to whether the icons of the printing apparatus 101 in the cloud print service are stored. By referring to the attribute information, the client terminal 104 using the icons of the printing apparatus 101 can prevent useless accesses for the icon acquisition.

The first exemplary embodiment has been described above centering on a configuration for including the storage data path information of the icon data of the printing apparatus 101 in the CPS 102. A second exemplary embodiment will be described below centering on a case where the printing apparatus 101 holds a plurality of icons. FIGS. 13A to 13C illustrate examples of icons held by the printing apparatus 101. The printing apparatus 101 holds icons having different resolutions and data volumes according to a demand on the user side. These icons have different resolutions, i.e., the icons in FIGS. 13A, 13B, and 13C are formed of 48, 128, and 512 pixels, respectively, in both width and height. The data volume of each icon increases with increasing resolution.

Figure 12:
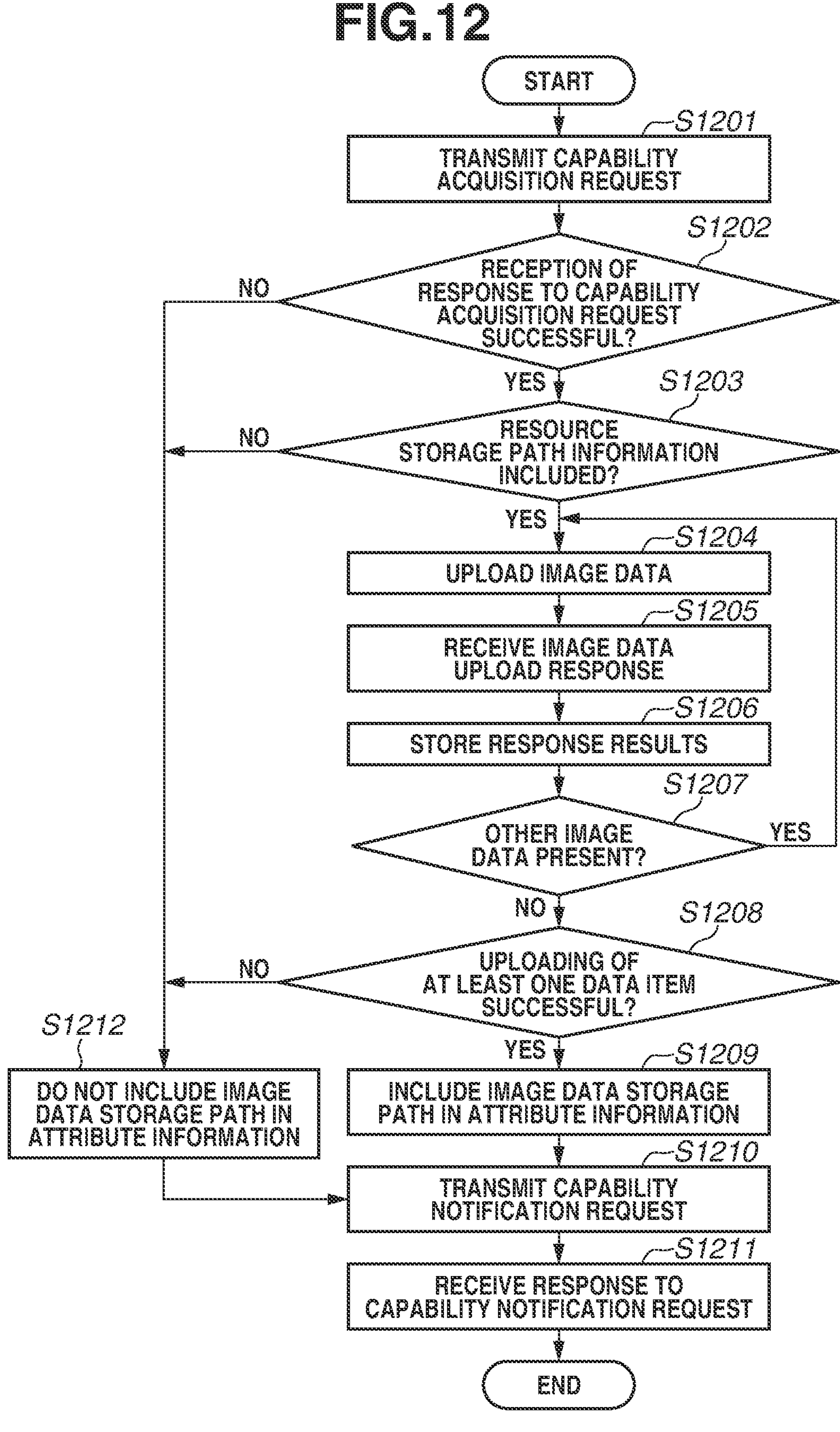
FIG. 12 is a flowchart illustrating an example of control performed by the printing apparatus according to a second exemplary embodiment.

FIG. 12 is a flowchart illustrating processing for icon registration from the printing apparatus 101 to the CPS 102 according to the present exemplary embodiment. In this flowchart, descriptions of processing similar to that in FIG. 5 according to the first exemplary embodiment will be omitted.

Figure 5:
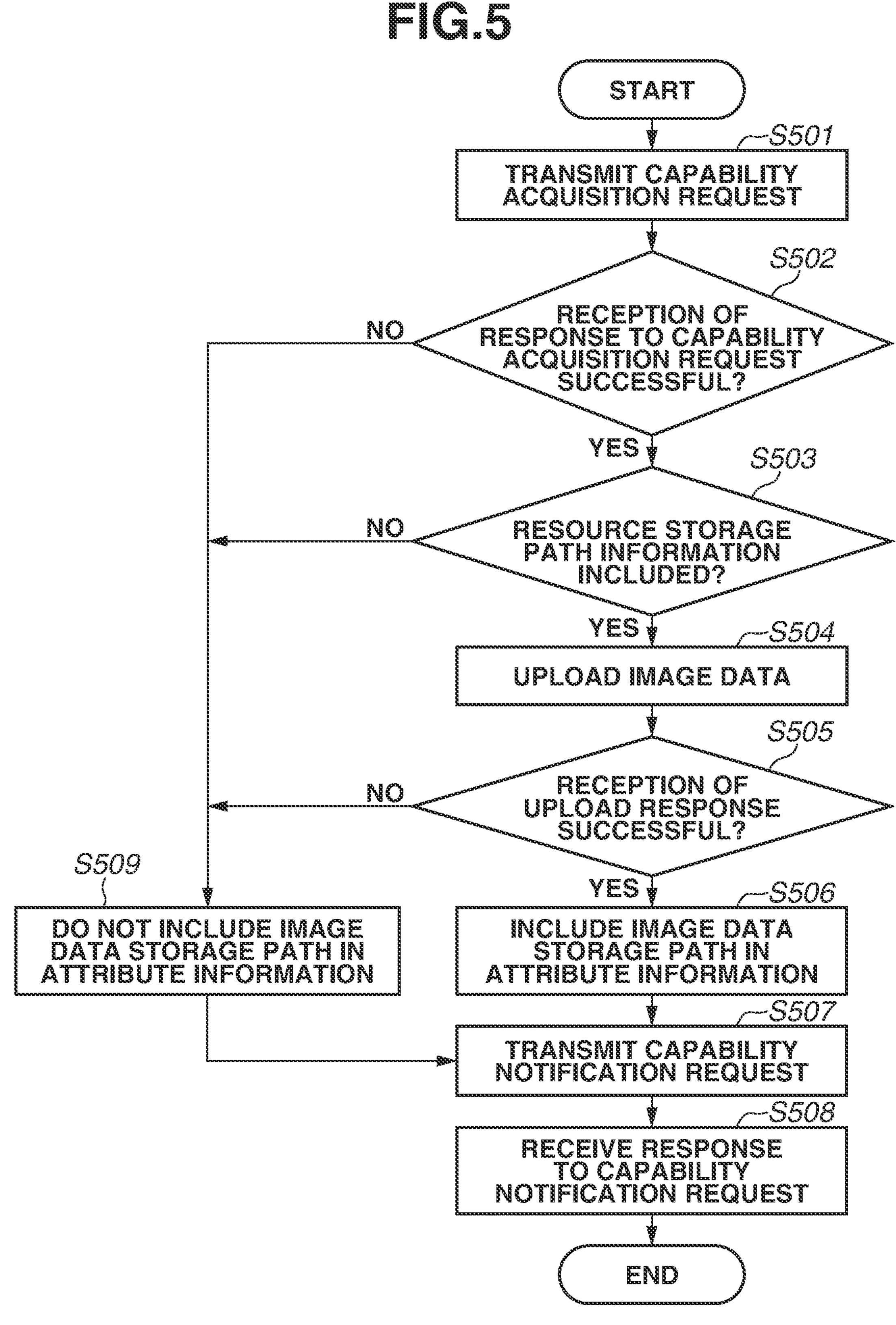
FIG. 5 is a flowchart illustrating an example of control performed by a printing apparatus according to a first exemplary embodiment.

When the icon registration processing is started, then in steps S1201, S1202, and S1203, the printing apparatus 101 checks whether the capability acquisition response packet received from the CPS 102 includes the icon resource storage path information, like steps S501, S502, and S503 in FIG. 5, respectively. If processing fails (NO in step S1202) or if the printing apparatus 101 confirms that the response packet does not include the icon resource storage path information (NO in step S1203), the processing proceeds to step S1212.

If the printing apparatus 101 confirms that the response packet includes the icon resource storage path information in step S1203 (YES in step S1203), the processing proceeds to step S1204. In step S1204, the printing apparatus 101 transmits an image data upload request packet to the CPS 102 to upload the image data. In step S1205, the printing apparatus 101 receives an image data upload response packet from the CPS 102. In step S1206, the printing apparatus 101 stores the result of the response. Then, the processing proceeds to step S1207. In step S1207, the printing apparatus 101 checks whether any other icon data items have not been uploaded to upload a plurality of icons held by the printing apparatus 101 to the icon data storage server 103. If there is at least one icon to be upload (YES in step S1207), the processing returns to step S1204. If here is no icon to be uploaded (NO in step S1207), the processing proceeds to step S1208.

In step S1208, the printing apparatus 101 refers to the result of image data uploading stored in step S1206 to check whether at least one of the plurality of icon data items has been successfully uploaded. If at least one icon data item has been successfully uploaded (YES step S1208), the processing proceeds to step S1209. If no icon data item has been successfully uploaded (NO in step S1208), the processing proceeds to step S1212. Processing in steps S1209 and S1212 is similar to the processing in steps S506 and S509 in FIG. 5, respectively, and redundant descriptions thereof will be omitted.

Upon completion of the processing in steps S1209 and S1212, the processing proceeds to steps S1210 and S1211. Then, the processing exits the icon registration processing. Processing in steps S1210 and S1211 is similar to the processing in steps S507 and S508 in FIG. 5, respectively, and redundant descriptions thereof will be omitted.

FIGS. 14A to 14C illustrate examples of HTTP packets transmitted by the printing apparatus 101 in step S1204. FIGS. 14A, 14B, and 14C illustrate image data upload request packets for transmitting icons having different sizes stored in the printing apparatus 101, corresponding to the icons in FIGS. 13A, 13B, and 13C, respectively. For example, when transmitting the small-sized icon in FIG. 13A, the printing apparatus 101 transmits the request packet in FIG. 14A including the image data through the HTTP PUT operation. This request packet includes the icon name, storage path information, image format, and file size.

Protocol: HTTP

PUT/Printer-icon-small.png HTTP/1.1

Host: https://print.microsoft.com/static-resource/Occ23168-d681-49b4-bc22-ef704a024aff Content-type: png Content-length: 8192

<Image data> (snip)

Likewise, when transmitting the middle-sized icon in FIG. 13B, the printing apparatus 101 transmits the image data upload request packet in FIG. 14B. When transmitting the large-sized icon in FIG. 13C, the printing apparatus 101 transmits the image data upload request packet in FIG. 14C. The packet configurations in FIGS. 14B and 14C are similar to the packet configuration in FIG. 14A except for the image data, file name, and file size, and redundant descriptions thereof will be omitted.

FIGS. 15A to 15C illustrate examples of IPP packets generated in step S1209 and transmitted in step S1210. The printing apparatus 101 attempts to upload a plurality of icons to the icon data storage server 103 through the processing in steps S1204 to S1207, and registers successfully uploaded icons to the CPS 102. FIG. 15A illustrates a capability notification request packet transmitted when all of the large-, middle-, and small-sized icons are uploaded. This request packet includes three different icon information acquisition paths in the icon URL information "printer-icons" in the attribute information.

Likewise, FIG. 15B illustrates a capability notification request packet transmitted when the middle- and small-sized icons are uploaded. This request packet includes two different icon information acquisition paths in the icon URL information in the attribute information. Likewise, FIG. 15C illustrates a capability notification packet transmitted when only the small-sized icon is uploaded. This packet includes one icon information acquisition path in the icon URL information in the attribute information.

FIGS. 16A to 16C illustrate examples of IPP packets transmitted by the CPS 102 to respond to the client terminal 104 in step S210. These packets are transmitted in response to the capability acquisition request from the client terminal 104 (in step S209 in FIG. 2). FIG. 16A illustrates a capability acquisition response packet transmitted when the large-, middle-, and small-sized icons are registered in the CPS 102 as illustrated in FIG. 15A. These response packets include three different icon information acquisition paths in the icon URL information "printer-icons" in the attribute information. Likewise, FIGS. 16B and 16C illustrate capability acquisition response packets used when the icons in FIGS. 15B and 15C are registered in the CPS 102, respectively. These response packets include two different icon information acquisition paths or one icon information acquisition path in the icon URL information in the attribute information, stored in the icon data storage server 103. When the client terminal 104 receives these capability acquisition response packets, the client terminal 104 can acquire suitable icon data according to the application by referring to the icon URL information in the attribute information.

In the above-described system configuration where a plurality of icons stored in the printing apparatus 101 is stored in the icon data storage server 103, the client terminal 104 can acquire only the icons stored the icon data storage server 103, via the CPS 102.

Other Exemplary Embodiments

Embodiments of the present disclosure can also be achieved when a program for implementing at least one of the functions according to the above-described exemplary embodiments is supplied to a system or apparatus via a network or storage medium, and at least one processor in a computer of the system or apparatus reads and executes the program. Further, embodiments of the present disclosure can also be achieved by a circuit (for example, an application specific integrated circuit (ASIC) and Field Programmable Gate Array (FPGA)) for implementing at least one function.

According to embodiments of the present disclosure, the printing apparatus 101 notifies the CPS 102 of the storage path URL information when image icon data is successfully uploaded. Therefore, the client terminal 104 does not uselessly access the icon data storage server 103, preventing excessive consumption of the communication traffic volume, communication bands, and printer search time.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-019679, filed Feb. 13, 2023, which is hereby incorporated by reference herein in its entirety.

What is claimed is:

1. A printing apparatus capable of, upon reception of a request for registering a printing apparatus, registering the printing apparatus, and, upon reception of an instruction for performing printing on the registered printing apparatus, performing communication, via the Internet, with a print service for providing the printing apparatus with a print job, the printing apparatus comprising:

at least one first processor and at least one first memory coupled to the first processor and having stored thereon instructions, when executed by the first processor, cooperating to act as:

a reception unit configured to receive storage information for storing icon image data of the printing apparatus from the print service;

a storage unit configured to store the icon image data of the printing apparatus based on the storage information; and a notification unit configured to, when notifying the print service of capability information of the printing apparatus, notify the print service of the capability information including path information of the stored icon image data of the printing apparatus, wherein, in a case where the reception unit receives the storage information but the storage unit fails in storing the icon image data of the printing apparatus, the notification unit notifies the print service of the capability information not including the path information.

2. The printing apparatus according to claim 1, wherein the reception unit receives the storage information after issuing a storage information request from the printing apparatus, and wherein, in a case where the reception unit does not receive the storage information even after issuing the storage information request from the printing apparatus, the notification unit notifies the print service of the capability information not including the path information.

3. The printing apparatus according to claim 1, wherein the capability information of the printing apparatus notified of by the notification unit includes at least one piece of model information of the printing apparatus.

4. The printing apparatus according to claim 1, wherein Internet Printing Protocol (IPP) is used for the capability notification of the printing apparatus by the notification unit and the reception of the print job.

5. The printing apparatus according to claim 1, wherein, after the printing apparatus is registered, the printing apparatus transmits a capability notification request packet of the printing apparatus to request for the storage information.

6. The printing apparatus according to claim 1, wherein the storage unit stores a plurality of icon image data items of the printing apparatus, and wherein the notification unit notifies the print service of the capability information including acquisition paths of the plurality of stored icon image data items.

7. The printing apparatus according to claim 1, wherein the capability information of the printing apparatus notified of by the notification unit is information to be supplied to a print application of a client terminal that transmits a print instruction to the printing apparatus, and wherein the print application displays a printing apparatus selection screen based on the supplied information.

8. A method for controlling a printing apparatus capable of, upon reception of a request for registering a printing apparatus, registering the printing apparatus, and, upon reception of an instruction for performing printing on the registered printing apparatus, performing communication, via the Internet, with a print service for providing the printing apparatus with a print job, the method comprising:

receiving storage information for storing icon image data of the printing apparatus from the print service;

storing the icon image data of the printing apparatus based on the storage information; and notifying, when notifying the print service of capability information of the printing apparatus, the print service of the capability information including path information for the stored icon image data of the printing apparatus, wherein, in a case where the receiving receives the storage information but the storing fails in storing the icon image data of the printing apparatus, the notifying notifies the print service of the capability information not including the path information.

9. A non-transitory computer-readable storage medium storing a program for causing a printing apparatus to execute a method for controlling the printing apparatus capable of, upon reception of a request for registering a printing apparatus, registering the printing apparatus, and, upon reception of an instruction for performing printing on the registered printing apparatus, performing communication, via the Internet, with a print service for providing the printing apparatus with a print job, the method comprising:

receiving storage information for storing icon image data of the printing apparatus from the print service;

storing the icon image data of the printing apparatus based on the storage information; and notifying, when notifying the print service of capability information of the printing apparatus, the print service of the capability information including path information for the stored icon image data of the printing apparatus, wherein, in a case where the receiving receives the storage information but the storing fails in storing the icon image data of the printing apparatus, the notifying notifies the print service of the capability information not including the path information.

* * * * *